United States Patent
Luo et al.

(10) Patent No.: US 11,546,604 B2
(45) Date of Patent: Jan. 3, 2023

(54) SYMMETRIC MOTION VECTOR DIFFERENCE CODING

(71) Applicant: VID SCALE, INC., Wilmington, DE (US)

(72) Inventors: Jiancong Luo, Skillman, NJ (US); Xiaoyu Xiu, San Diego, CA (US); Yuwen He, San Diego, CA (US); Hua Yang, Plainsboro, NJ (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 17/416,205

(22) PCT Filed: Dec. 19, 2019

(86) PCT No.: PCT/US2019/067527
§ 371 (c)(1),
(2) Date: Jun. 18, 2021

(87) PCT Pub. No.: WO2020/132272
PCT Pub. Date: Jun. 25, 2020

(65) Prior Publication Data
US 2022/0150505 A1    May 12, 2022

Related U.S. Application Data

(60) Provisional application No. 62/809,308, filed on Feb. 22, 2019, provisional application No. 62/798,674, (Continued)

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11); *H04N 19/46* (2014.11)

(58) Field of Classification Search
CPC .. H04N 19/137; H04N 19/105; H04N 19/159; H04N 19/176; H04N 19/46
See application file for complete search history.

(56) References Cited

U.S. PATENT DOCUMENTS

| | | | |
|---|---|---|---|
| 2018/0192072 A1* | 7/2018 | Chen | H04N 19/176 |
| 2018/0278949 A1* | 9/2018 | Karczewicz | H04N 19/513 |
| 2022/0078488 A1* | 3/2022 | Leleannec | H04N 19/109 |

OTHER PUBLICATIONS

"BMS-2.0 Reference Software", Available at <https://vcgit.hhi.fraunhofer.de/jvet/VVCSoftware_BMS/tags/BMS-2.1rc1>, 1 page.
(Continued)

*Primary Examiner* — Francis Geroleo
(74) *Attorney, Agent, or Firm* — Condo Roccia Koptiw LLP

(57) ABSTRACT

Bi-directional optical flow (BDOF) may be bypassed, for a current coding block, based on whether symmetric motion vector difference (SMVD) is used in motion vector coding for the current coding block, A coding device (e.g., an encoder or a decoder) may determine whether to bypass BDOF for the current coding block based at least in part on an SMVD indication for the current coding block, The coding device may obtain the SMVD indication that indicates whether SMVD is used in motion vector coding for the current coding block. If SMVD Indication indicates that SMVD is used in the motion vector coding for the current coding block, the coding device may bypass BDOF for the current coding block. The coding device may reconstruct, the current coding block without performing BDOF if it determines to bypass BDOF for the current coding block.

22 Claims, 16 Drawing Sheets

Related U.S. Application Data filed on Jan. 30, 2019, provisional application No. 62/792,710, filed on Jan. 15, 2019, provisional application No. 62/787,321, filed on Jan. 1, 2019, provisional application No. 62/783,437, filed on Dec. 21, 2018.

(51) Int. Cl.
  *H04N 19/159*  (2014.01)
  *H04N 19/176*  (2014.01)
  *H04N 19/46*  (2014.01)

(56) References Cited

OTHER PUBLICATIONS

"HM-16.9 Reference Software", Available at <https://hevc.hhi.fraunhofer.de/svn/svn_HEVCSoftware>, Mar. 2016, 1 page.
"JEM-7.0 Reference Software", Available at <https://jvet.hhi.fraunhofer.de/svn/svn_HMJEMSoftware/tags/HM-16.6-JEM-7.0>, 1 page.
"VTM-2.0.1 Reference Software", Available at <https://vcgit.hhi.fraunhofer.de/jvet/VVCSoftware_VTM/tags/VTM-2.0.1>, 1 page.
Bross et al., "High Efficiency Video Coding (HEVC) Text Specification Draft 10 (For FDIS & Consent)", JCTVC-L1003_V1, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.
Bross et al., "Versatile Video Coding (Draft 2)", JVET-K1001-V1, Editors, Joint Video Experts Team (JVET) of ITU-T SG 16 WP3 and ISO/IEC JTC1/SC29/WG11, 11th Meeting: Ljubljana, Sl, Jul. 10-18, 2018, 42 pages.
Chen et al., "BDOF Simplifications", JVET-O0634, Huawei Technologies Co., Ltd., Joint Video Experts Team (JVET) of ITU-T SG 16 WP 3 and ISO/IEC JTC 1/SC 29/WG 11, 15th Meeting: Gothenburg, SE, Jul. 3-12, 2019, 7 pages.
Chen et al., "CE4: Symmetrical MVD Mode (Test 4.5.1)", JVET-L0370-V1, Huawei Technologies. Co., Ltd., Joint Video Experts Team (JVET) of ITU-T SG 16 WP 3 and ISO/IEC JTC 1/SC 29/WG 11, 12th Meeting: Macau, China, Oct. 3-12, 2018, pp. 1-4.
Chen et al., "Generalized Bi-Prediction for Inter Coding", JVET-C0047, InterDigital Communications, Inc., Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-4.
He et al., "CE4-Related: Encoder Speed-Up and Bug Fix for Generalized Bi-Prediction in BMS-2.1", JVET-L0296, InterDigital Communications, Inc., Joint Video Experts Team(JVET) of ITU-T SG 16 WP 3 and ISO/IEC JTC 1/SC 29/WG11, 12thMeeting: Macao, CN, Oct. 3-12, 2018, pp. 1-5.
ITU-T, "Advanced Video Coding for Generic Audiovisual Services", ITU-T Recommendation H.264, Series H: Audiovisual and Multimedia Systems, Infrastructure of Audiovisual Services—Coding of Moving Video, Nov. 2007, 563 pages.
Jeong et al., "CE4 Ultimate Motion Vector Expression (Test 4.5.4)", JVET-L0054, Samsung Electronics Co., Ltd., Joint Video Experts Team (JVET) of ITU-T SG 16 WP 3 and ISO/IEC JTC 1/SC 29/WG11, 12thMeeting: Macao, CN, Oct. 3-12, 2018, pp. 1-6.
Leannec et al., "Non-CE4: Simplified SMVD Mode Coding", JVET-O0468, InterDigital Communications, Inc., Joint Video Experts Team (JVET) of ITU-T SG 16 WP 3 and ISO/IEC JTC 1/SC 29/WG 11, 15th Meeting: Gothenburg, SE, Jul. 3-12, 2019, 3 pages.
Lee et al., "Non-CE4: Simplification of Decoding Process for SMVD Reference Indices", JVET-N0472_V2, ETRI (Electronics and Telecommunications Research Institute), Joint Video Experts Team (JVET) of ITU-T SG 16 WP 3 and ISO/IEC JTC 1/SC 29/WG 11, 14th Meeting: Geneva, CH, Mar. 19-27, 2019, 6 pages.
Segall et al., "Joint Call for Proposals on Video Compression with Capability Beyond HEVC", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.
SMPTE, "VC-1 Compressed Video Bitstream Format and Decoding Process", SMPTE 421M, Apr. 2006, 493 pages.
Tourapis et al., "H.264/14496-10 AVC Reference Software Manual", JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.
Wikipedia, "Sobel Filter", Available at <https://en.wikipedia.org/wiki/Sobel_operator>, Feb. 20, 2021, pp. 1-8.
Xiu et al., "Non-CE4: On SAD Threshold for BDOF Early Termination", JVET-P0519, Kwai Inc., Joint Video Experts Team (JVET) of ITU-T SG 16 WP 3 and ISO/IEC JTC 1/SC 29 WG 11, 16th Meeting: Geneva, CH, Oct. 1-11, 2019, 2 pages.
Yang et al., "BoG Report on CE4 Inter Prediction Related Contributions", JVET-P0986-V4, BoG Coordinators, Joint Video Experts Team (JVET) of ITU-T SG 16 WP 3 and ISO/IEC JTC1/SC 29/WG 11, 16th Meeting: Geneva, CH, Oct. 1-11, 2019, 29 pages.

\* cited by examiner

US 11,546,604 B2

SYMMETRIC MOTION VECTOR DIFFERENCE CODING

CROSS-REFERENCE TO RELATED CASES

The present application is the National Stage Entry under 35 U.S.C. § 371 of Patent Cooperation Treaty Application No. PCT/US2019/067527, filed Dec. 19, 2019, which claims the benefit of U.S. Provisional Patent Application No. 62/783,437, filed Dec. 21, 2018, U.S. Provisional Patent Application No. 62/787,321, filed Jan. 1, 2019, U.S. Provisional Patent Application No. 62/792,710, filed Jan. 15, 2019, U.S. Provisional Patent Application No. 62/798,674, filed Jan. 30, 2019, and U.S. Provisional Patent Application No. 62/809,308, filed Feb. 22, 2019, the contents of which are hereby incorporated by reference in their entireties.

BACKGROUND

Video coding systems may be used to compress digital video signals, e.g., to reduce the storage and/or transmission bandwidth needed for such signals. Video coding systems may include block-based, wavelet-based, and/or object-based systems. The systems employ video coding techniques, such as bi-directional motion compensated prediction (MCP), which may remove temporal redundancies by exploiting temporal correlations between pictures. Such techniques may increase the complexity of computations performed during encoding and/or decoding.

SUMMARY

Bi-directional optical flow (BDOF) may be bypassed, for a current coding block, based on whether symmetric motion vector difference (SMVD) is used in motion vector coding for the current coding block.

A coding device (e.g., an encoder or a decoder) may determine that BDOF is enabled. The coding device may determine whether to bypass BDOF for the current coding block based at least in part on an SMVD indication for the current coding block. The coding device may obtain the SMVD indication that indicates whether SMVD is used in motion vector coding for the current coding block. If SMVD indication indicates that SMVD is used in the motion vector coding for the current coding block, the coding device may bypass BDOF for the current coding block. The coding device may reconstruct the current coding block without performing BDOF if it determines to bypass BDOF for the current coding block.

A motion vector difference (MVD) for the current coding block may indicate a difference between a motion vector predictor (MVP) for the current coding block and a motion vector (MV) for the current coding block. The MVP for the current coding block may be determined based on an MV of a spatial neighboring block of the current coding block and/or a temporal neighboring block of the current coding block.

If an SMVD indication indicates SMVD is used for the motion vector coding for the current coding block, the coding device may receive a first motion vector coding information associated with a first reference picture list. The coding device may determine a second motion vector coding information associated with a second reference picture list based on the first motion vector coding information associated with the first reference picture list and that the MVD associated with the first reference picture list and the MVD associated with the second reference picture list are symmetric.

In an example, if the SMVD indication indicates SMVD is used for the motion vector coding for the current coding block, the coding device may parse a first MVD associated with a first reference picture list in a bitstream. The coding device may determine a second MVD associated with a second reference picture list based on the first MVD and that the first MVD and the second MVD are symmetric to each other.

If the coding device determines not to bypass BDOF for the current coding block, the coding device may refine a motion vector of a (e.g., each) sub-block of the current coding block based at least in part on gradients associated with a location in the current coding block.

The coding device may receive a sequence-level SMVD indication that indicates whether SMVD is enabled for a sequence of pictures. If SMVD is enabled for the sequence of pictures, the coding device may obtain the SMVD indication associated with the current coding block based on the sequence-level SMVD indication.

DETAILED DESCRIPTION

A more detailed understanding may be had from the following description, given by way of example in conjunction with the accompanying drawings.

Figure 1A:
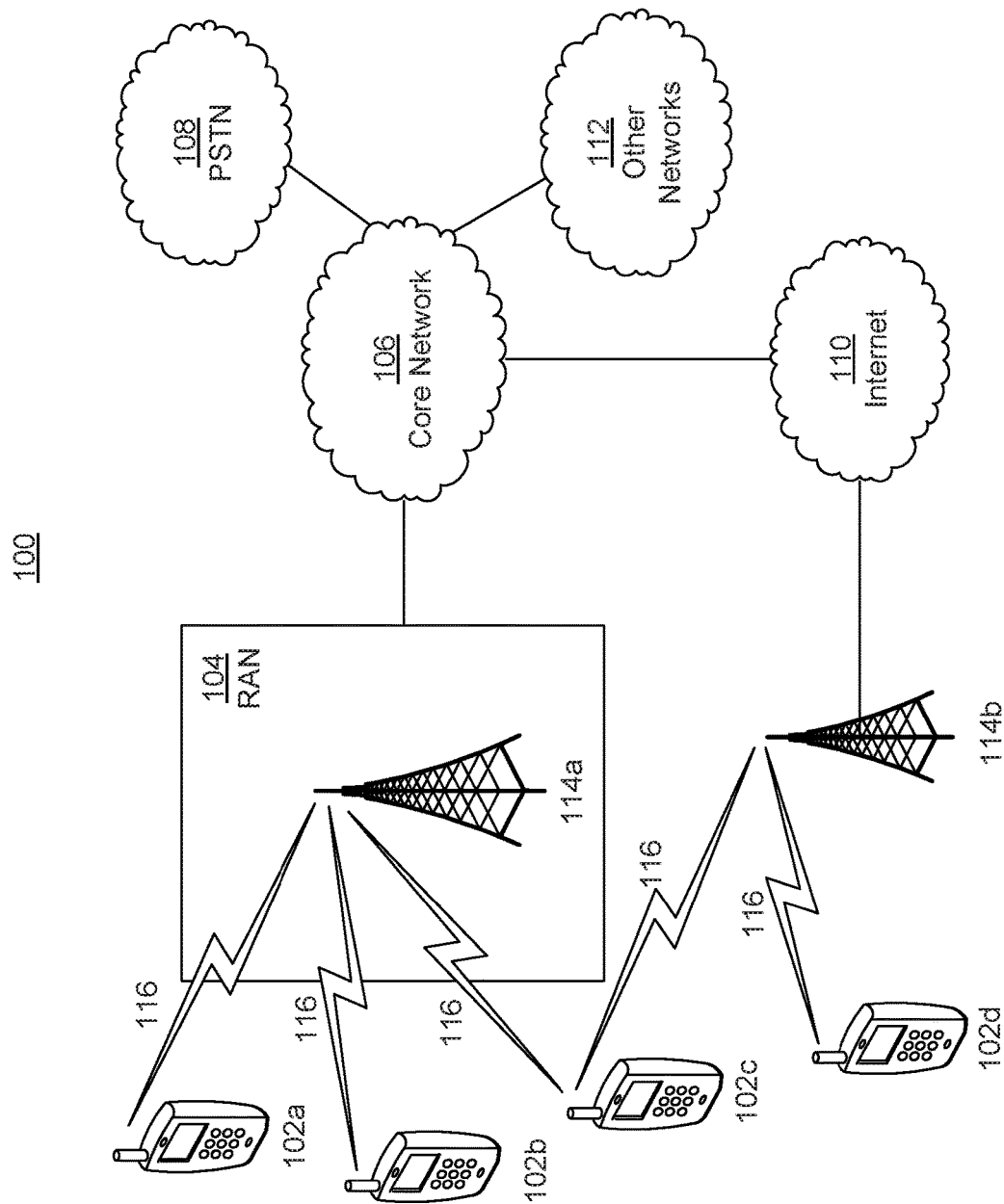
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE. The coding device may be or may include a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
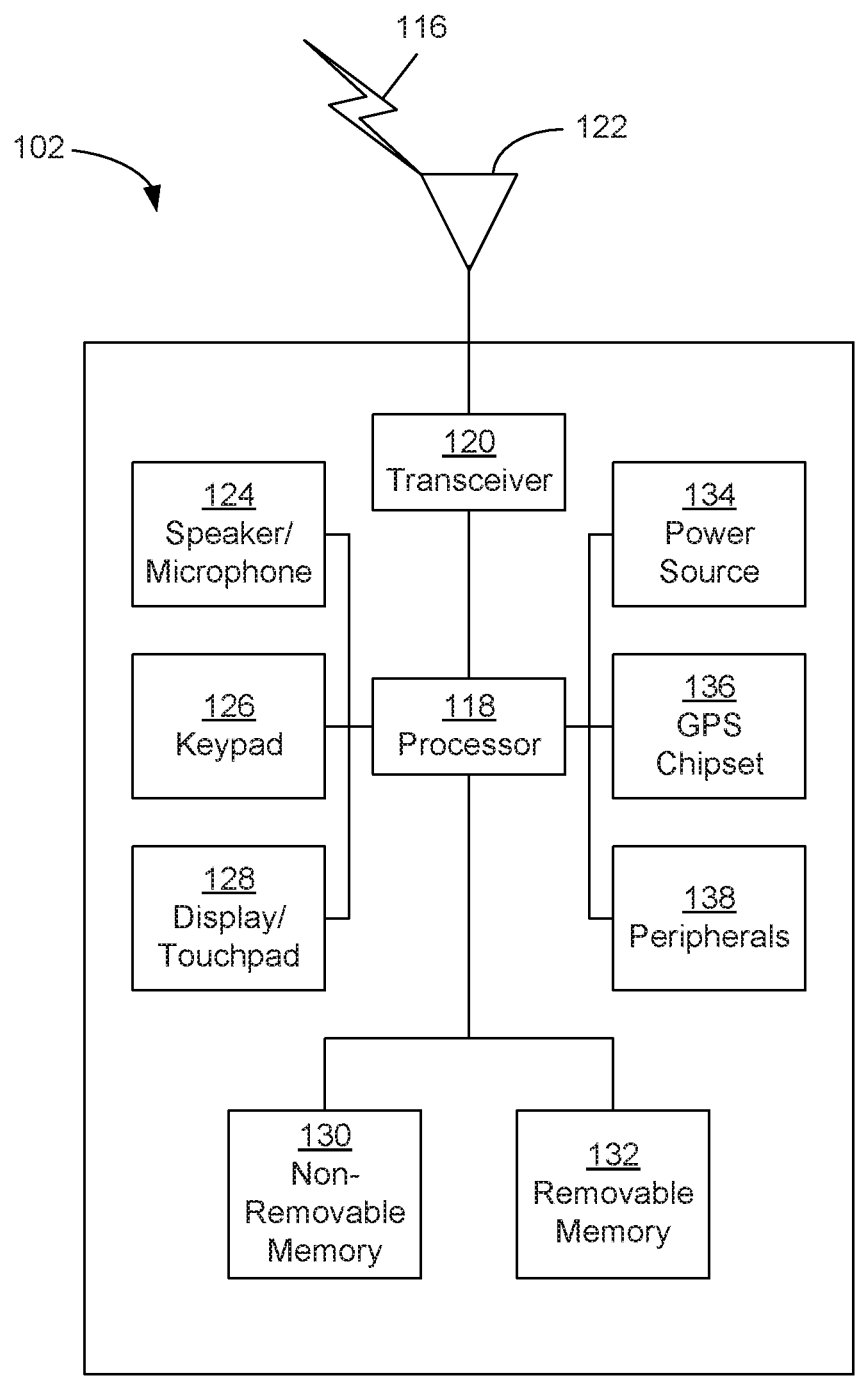
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
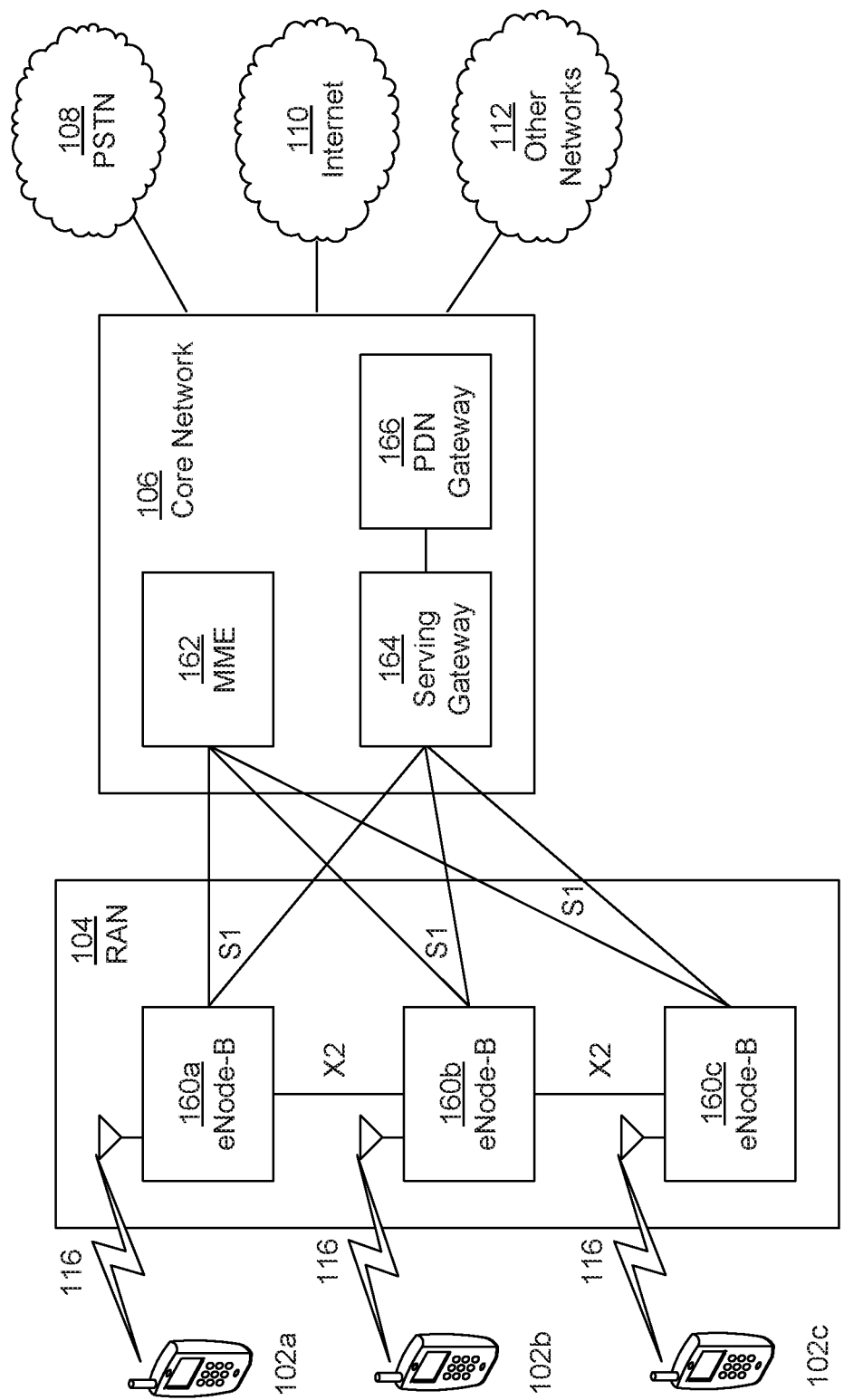
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an 'ad-hoc' mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
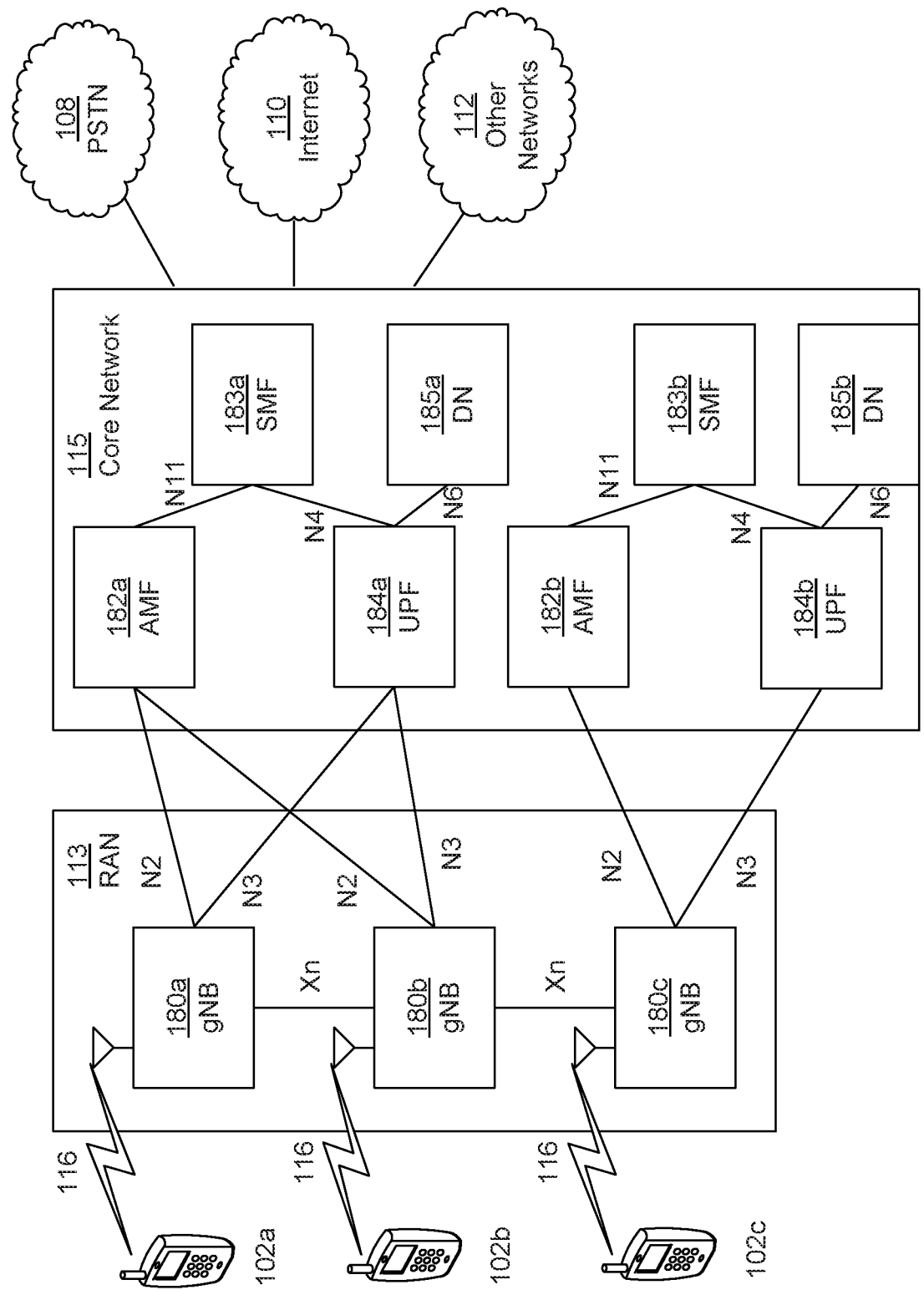
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology.

For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Video coding systems may be used to compress digital video signals, which may reduce the storage needs and/or the transmission bandwidth of video signals. Video coding systems may include block-based, wavelet-based, and/or object-based systems. Block-based video coding systems may include MPEG-1/2/4 part 2, H.264/MPEG-4 part 10 AVC, VC-1, High Efficiency Video Coding (HEVC) and/or Versatile Video Coding (WC).

Figure 2:
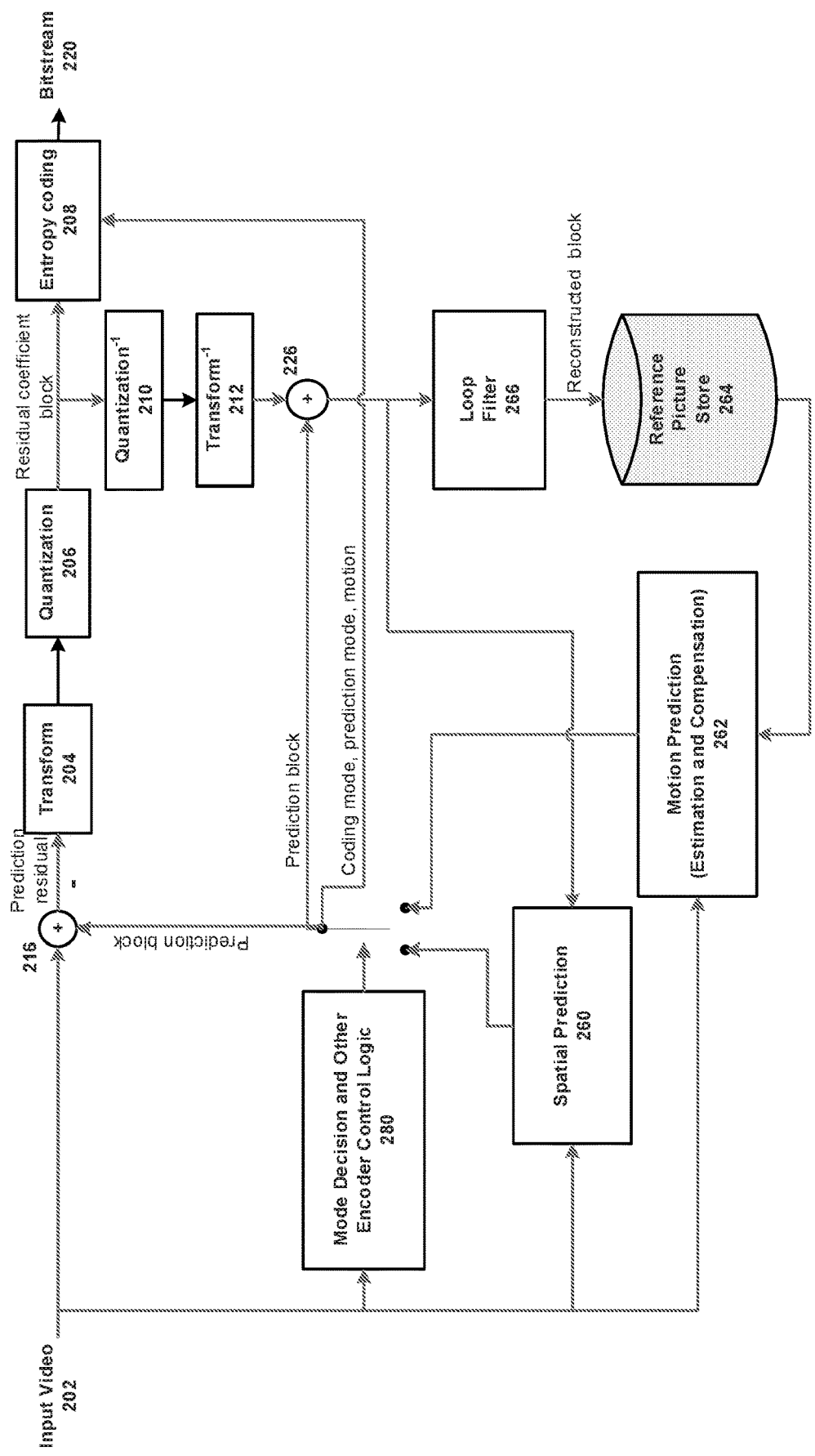
FIG. 2 is a diagram of an example block-based hybrid video encoding framework for an encoder.

Block-based video coding systems may include a block-based hybrid video coding framework. FIG. 2 is a diagram of an example block-based hybrid video encoding framework for an encoder. An encoder may include a WTRU. An input video signal 202 may be processed block-by-block. Block sizes (e.g., extended block sizes, such as a coding unit (CU)) may compress high resolution (e.g., 1080p and beyond) video signals. For example, a CU may include 64×64 pixels or more. A CU may be partitioned into prediction units (PUs), and/or separate predictions may be used. For an input video block (e.g., macroblock (MB) and/or a CU), spatial prediction 260 and/or temporal prediction 262 may be performed. Spatial prediction 260 (e.g., intra prediction) may use pixels from samples of coded neighboring blocks (e.g., reference samples) in the video picture/slice to predict the current video block. The spatial prediction 260 may reduce spatial redundancy, for example, that may be inherent in the video signal. Motion prediction 262 (e.g., inter prediction and/or temporal prediction) may use reconstructed pixels from the coded video pictures, for example, to predict the current video block. The motion prediction 262 may reduce temporal redundancy, for example, that may be inherent in the video signal. Motion prediction signals for a video block may be signaled by one or more motion vectors and/or may indicate the amount and/or the direction of motion between the current block and/or the current block's reference block. If multiple reference pictures are supported for a (e.g., each) video block, the video block's reference picture index may be sent. The reference picture index may be used to identify from which reference picture in a reference picture store 264 the motion prediction signal may derive.

After the spatial prediction 260 and/or motion prediction 262, a mode decision block 280 in the encoder may determine a prediction mode (e.g., the best prediction mode), for example, based on a rate-distortion optimization. The prediction block may be subtracted from a current video block 216 and/or the prediction residual may be de-correlated using a transform 204 and/or a quantization 206 to achieve a bit-rate, such as a target bit rate. The quantized residual coefficients may be inverse quantized at quantization 210 and/or inverse transformed at transform 212, for example, to form the reconstructed residual, which may be added to the prediction block 226, for example, to form a reconstructed video block. In-loop filtering (e.g., a de-blocking filter and/or adaptive loop filters) may be applied at loop filter 266 on the reconstructed video block before the reconstructed video block may be put in the reference picture store 264 and/or used to code video blocks (e.g., future video blocks). To form the output video bit-stream 220, coding mode (e.g., inter or intra), prediction mode information, motion information, and/or quantized residual coefficients may be sent (e.g., may all be sent) to an entropy coding module 208, for example, to be compressed and/or packed to form the bit-stream.

Figure 3:
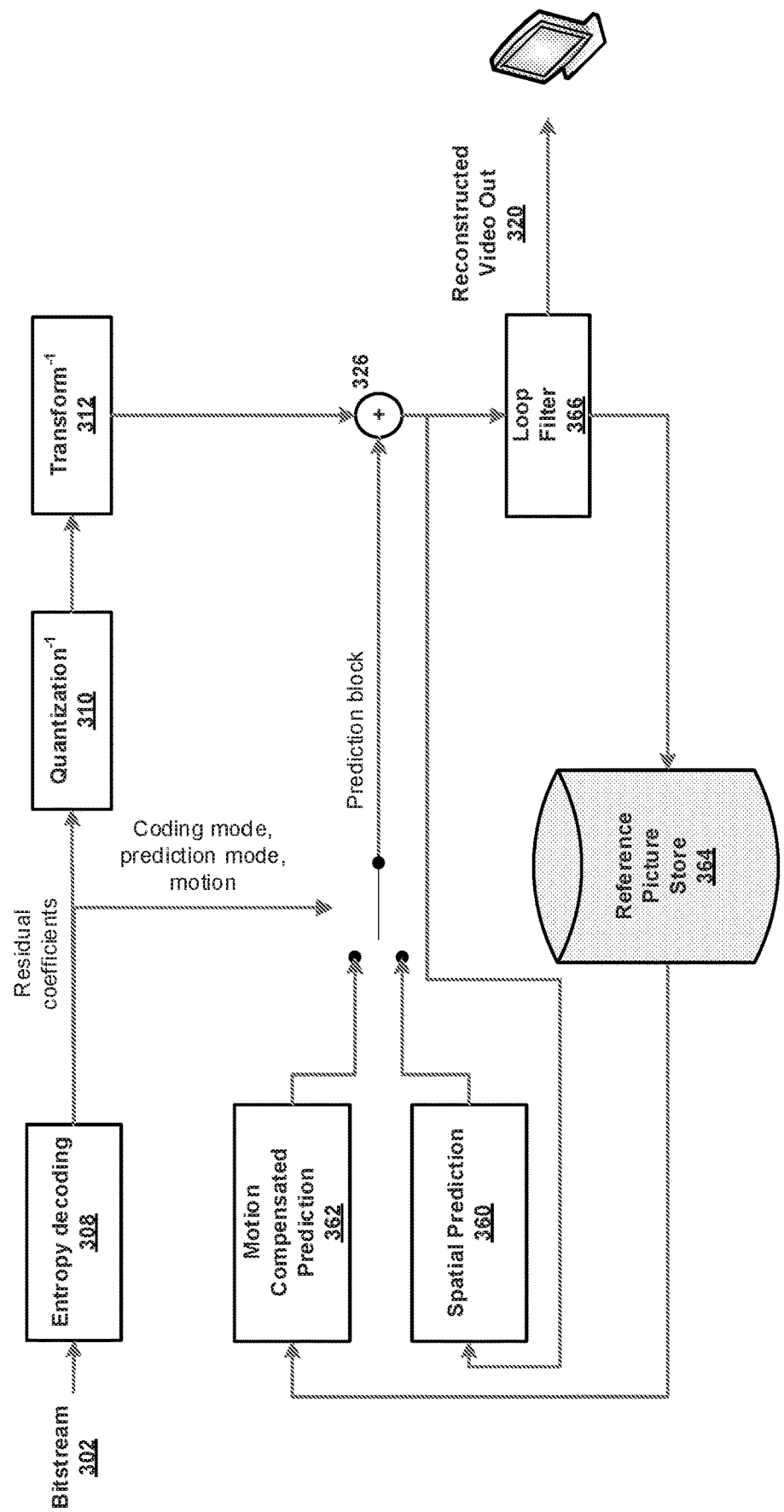
FIG. 3 is a diagram of an example block-based video decoding framework for a decoder.

FIG. 3 is a diagram of an example block-based video decoding framework for a decoder. A decoder may include a WTRU. A video bit-stream 302 (e.g., the video bit-stream 220 in FIG. 2) may be unpacked (e.g., first unpacked) and/or entropy decoded at an entropy decoding module 308. The coding mode and prediction information may be sent to a spatial prediction module 360 (e.g., if intra coded) and/or to a motion compensation prediction module 362 (e.g., if inter coded and/or temporal coded) to form a prediction block. Residual transform coefficients may be sent to an inverse quantization module 310 and/or to an inverse transform module 312, e.g., to reconstruct the residual block. The prediction block and/or the residual block may be added together at 326. The reconstructed block may go through in-loop filtering at a loop filter 366, for example, before the reconstructed block is stored in a reference picture store 364. The reconstructed video 320 in the reference picture store 364 may be sent to a display device and/or used to predict video blocks (e.g., future video blocks).

The use of bi-directional motion compensated prediction (MCP) in video codecs may remove temporal redundancies by exploiting temporal correlations between pictures. A bi-prediction signal may be formed by combining two uni-prediction signals using a weight value (e.g., 0.5). In certain videos, illuminance characteristics may change rapidly from one reference picture to another. Thus, prediction techniques may compensate for variations in illuminance over time (e.g., fading transitions) by applying global or local weights and offset values to one or more sample values in the reference pictures.

MCP in a bi-prediction mode may be performed using CU weights. As an example, MCP may be performed using bi-prediction with CU weights. An example of bi-prediction with CU weights (BCW) may include generalized bi-prediction (GBi). A bi-prediction signal may be calculated based on one or more of weight(s), motion-compensated prediction signal(s) corresponding to a motion vector associated with a reference picture list(s), and/or the like. In an example, the prediction signal at sample x (as given) in a bi-prediction mode may be calculated using Eq.1.

$$P[x] = w_0 * P_0[x+v_0] + w_1 * P_1[x+v_1] \qquad \text{Eq.1}$$

$P[x]$ may denote the resulting prediction signal of a sample x located at a picture position x. $P_i[x+v_i]$ may denote the motion-compensated prediction signal of x using the motion vector (MV) $v_i$ for i-th list (e.g., list 0, list 1, etc.). $w_0$ and $w_1$ may denote the two weight values that are applied on a prediction signal(s) for a block and/or CU. As an example, $w_0$ and $w_1$ may denote the two weight values shared across the samples in a block and/or CU. A variety of prediction signals may be obtained by adjusting the weight value(s). As shown in Eq.1, a variety of prediction signals may be obtained by adjusting weight values $w_0$ and $w_1$.

Some configurations of weight values $w_0$ and $w_1$ may indicate prediction such as uni-prediction and/or bi-prediction. For example, $(w_0, w_1)=(1, 0)$ may be used in associated with uni-prediction with reference list L0. $(w_0, w_1)=(0,1)$ may be used in association with uni-prediction with reference list L1. $(w_0, w_1)=(0.5, 0.5)$ may be used in association with the bi-prediction with two reference lists (e.g., L1 and L2).

Weight(s) may be signaled at the CU level. In an example, the weight values $w_0$ and $w_1$ may be signaled per CU. Bi-prediction may be performed with the CU weights. A constraint for the weights may be applied to a pair of weights. The constraint may be preconfigured. For example, the constraint for the weights may include $w_0+w_1=1$. A weight may be signaled. The signaled weight may be used to determine another weight. For example, with the constraint for CU weights, only one weight may be signaled.

Signaling overhead may be reduced. Examples of pairs of weights may include {(4/8, 4/8), (3/8, 5/8), (5/8, 3/8), (−2/8, 10/8), (10/8, −2/8)}.

A weight may be derived based on a constraint for the weights, for example, when unequal weights are to be used. A coding device may receive a weight indication and determine a first weight based on the weight indication. The coding device may derive a second weight based on the determined first weight and the constraint for the weights.

Eq. 2 may be used. In an example, Eq. 2 may be produced based on Eq. 1 and the constraint of $w_0+w_1=1$.

$$P[x]=(1-w_1)*P_0[x+v_0]+w_1*P_1[x+v_1] \quad \text{Eq. 2}$$

Weight values (e.g., $w_1$ and/or $w_0$) may be discretized. Weight signaling overhead may be reduced. In an example, bi-prediction CU weight value $w_1$ may be discretized. The discretized weight value $w_1$ may include, for example, one or more of −2/8, 2/8, 3/8, 4/8, 5/8, 6/8, 10/8, and/or the like. A weight indication may be used to indicate weights to be used for a CU, for example, for bi-prediction. An example of the weight indication may include a weight index. In an example, each weight value may be indicated by an index value.

Figure 4:
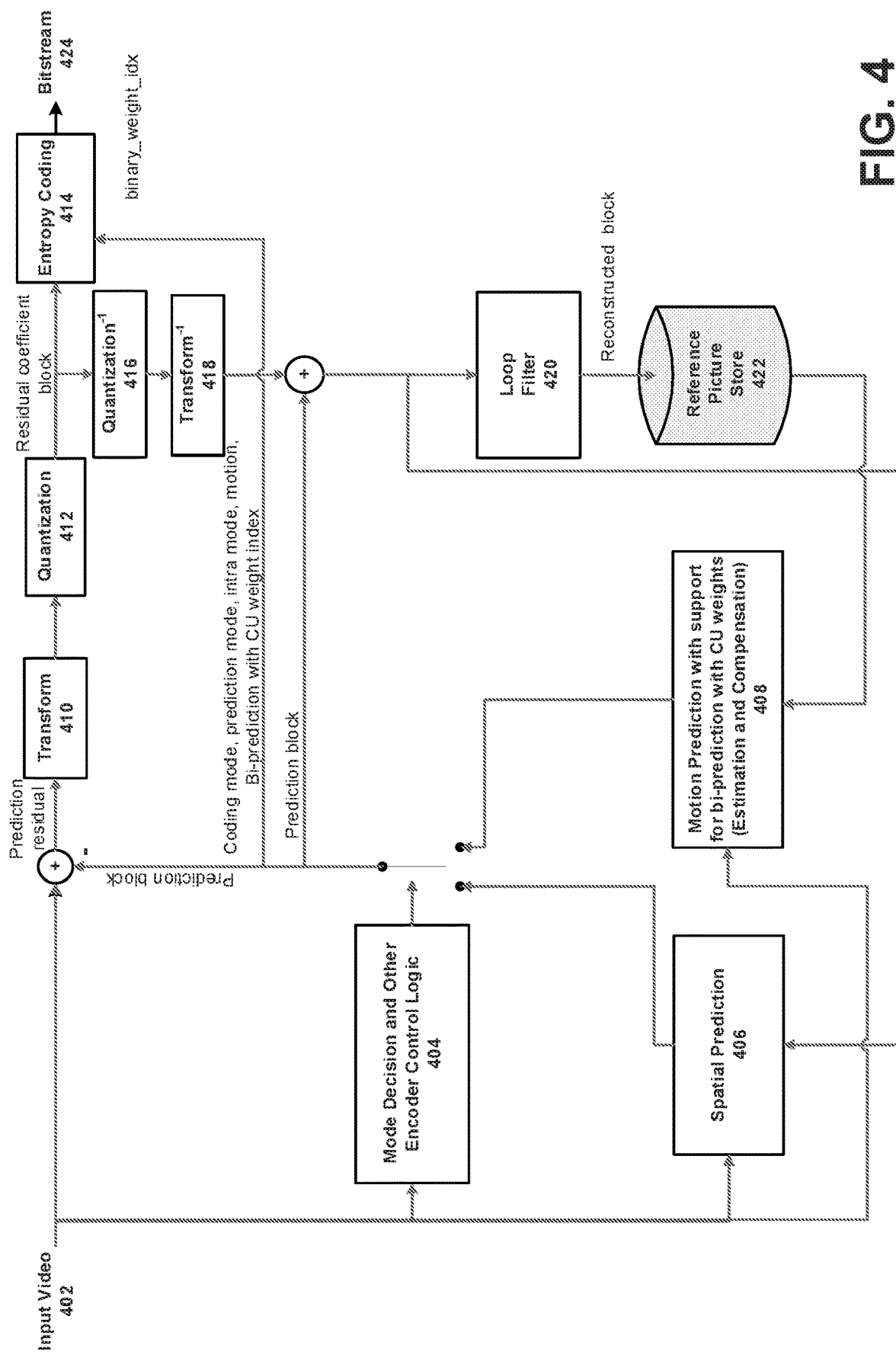
FIG. 4 is a diagram of an example video encoder with support of bi-prediction with CU weights (e.g., GBi).

FIG. 4 is a diagram of an example video encoder with support of BCW (e.g., GBi). An encoding device as described in the example shown in FIG. 4 may be or may include a WTRU. The encoder may include a mode decision module 404, spatial prediction module 406, a motion prediction module 408, a transform module 410, a quantization module 412, an inverse quantization module 416, an inverse transform module 418, a loop filter 420, a reference picture store 422 and an entropy coding module 414. In examples, some or all of the encoder's modules or components (e.g., the spatial prediction module 406) may be the same as, or similar to, those described in connection with FIG. 2. In addition, the spatial prediction module 406 and the motion prediction module 408 may be pixel-domain prediction modules. Thus, an input video bit-stream 402 may be processed in a similar manner as the input video bit-stream 202, to output video bit-stream 424. The motion prediction module 408 may further include support of bi-prediction with CU weights. As such, the motion prediction module 408 may combine two separate prediction signals in a weighted-averaging manner. Further, the selected weight index may be signaled in the input video bitstream 402.

Figure 5:
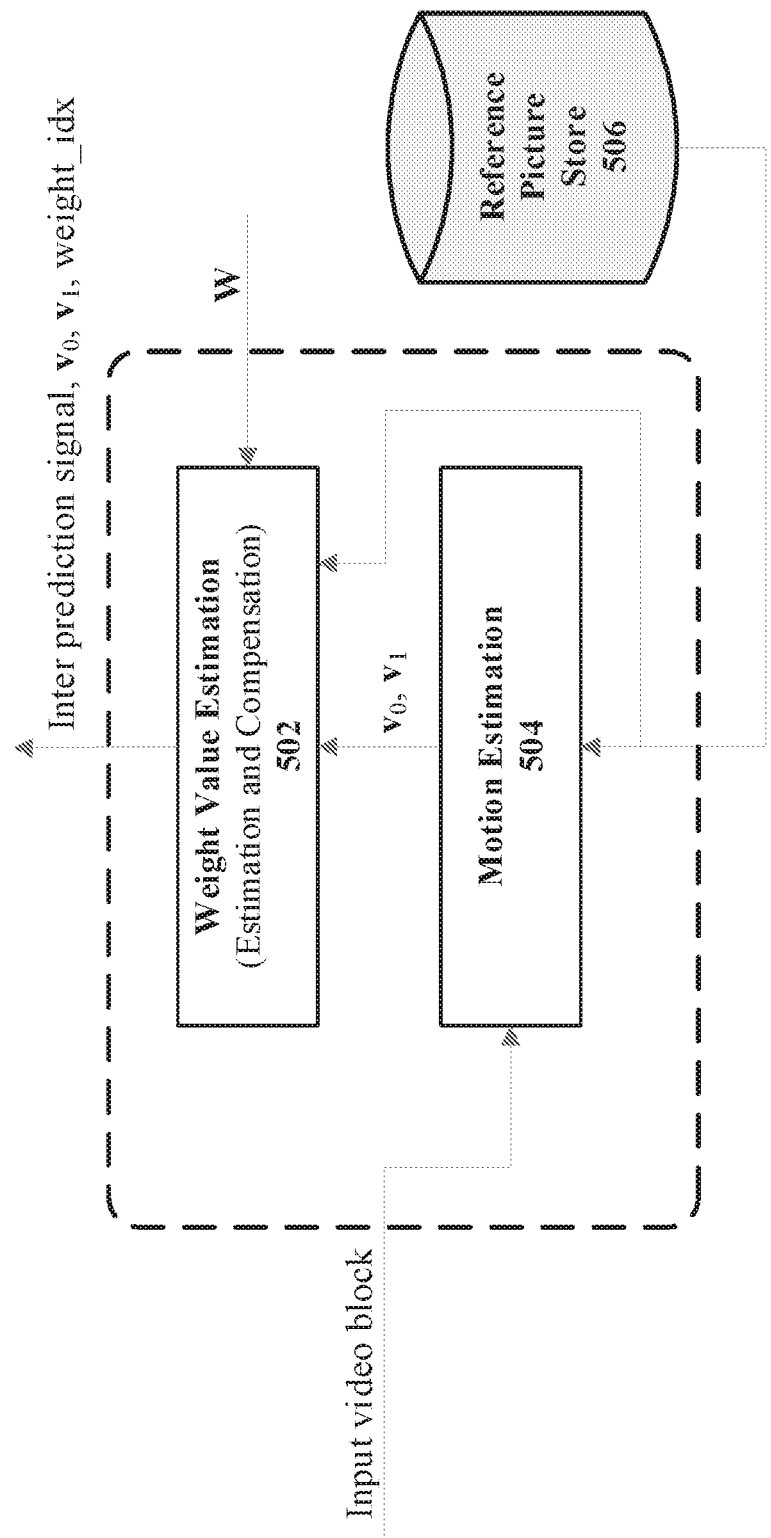
FIG. 5 is a diagram of an example module with support for bi-prediction with CU weights for an encoder.

FIG. 5 is a diagram of an example module with support for bi-prediction with CU weights for an encoder. FIG. 5 illustrates a block diagram of an estimation module 500. The estimation module 500 may be employed in a motion prediction module of an encoder, such as the motion prediction module 408. The estimation module 500 may be used in connection with BCW (e.g., GBi). The estimation module 500 may include a weight value estimation module 502 and a motion estimation module 504. The estimation module 500 may utilize a two-step process to generate inter prediction signal, such as a final inter prediction signal. The motion estimation module 504 may perform motion estimation using reference picture(s) received from a reference picture store 506 and by searching two optimal motion vectors (MVs) pointing to (e.g., two) reference blocks. The weight value estimation module 502 may search for the optimal weight index to minimize the weighted bi-prediction error between the current video block and bi-prediction prediction. The prediction signal of the generalized bi-prediction may be computed as a weighted average of the two prediction blocks.

Figure 6:
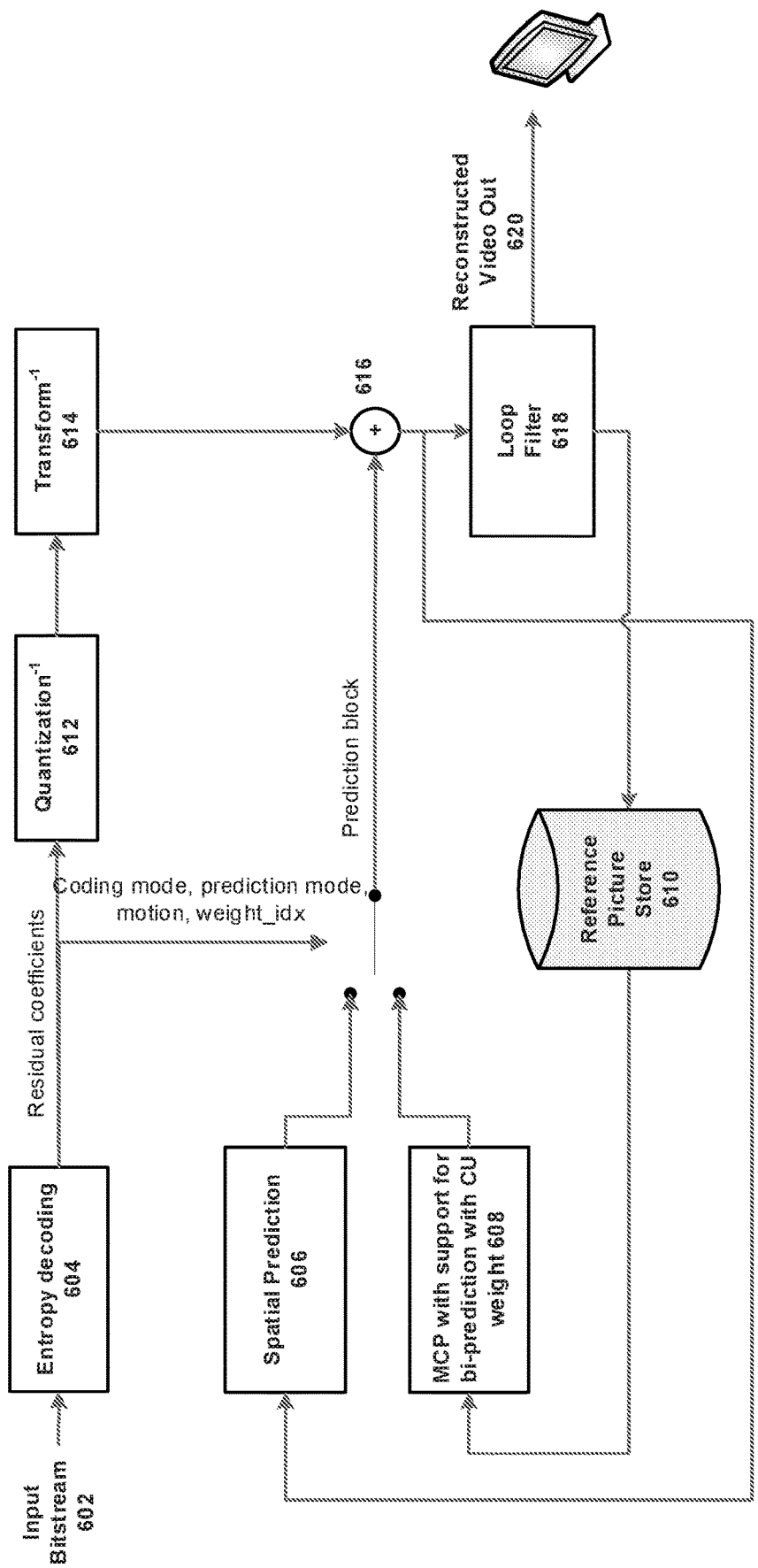
FIG. 6 is a diagram of an example block-based video decoder with support for bi-prediction with CU weights.

FIG. 6 is a diagram of an example block-based video decoder with support for bi-prediction with CU weights. FIG. 6 illustrates a block diagram of an example video decoder that may decode a bit-stream from an encoder. The encoder may support BCW and/or share some similarities with the encoder described in connection with FIG. 4. A decoder as described in the example shown in FIG. 6 may include a WTRU. As shown in FIG. 6, the decoder may include an entropy decoder 604, a spatial prediction module 606, a motion prediction module 608, a reference picture store 610, an inverse quantization module 612, an inverse transform module 614 and a loop filter module 618. Some or all of the decoder's modules may be the same as, or similar to, those described in connection with FIG. 3. For example, the prediction block and/or residual block may be added together at 616. A video bit-stream 602 may be processed to generate the reconstructed video 620 that may be sent to a display device and/or used to predict video blocks (e.g., future video blocks). The motion prediction module 608 may further include support for BCW. The coding mode and/or prediction information may be used to derive a prediction signal using either spatial prediction or MCP with support for BCW. For BCW, the block motion information and/or weight value (e.g., in the form of an index indicating a weight value) may be received and decoded to generate the prediction block.

Figure 7:
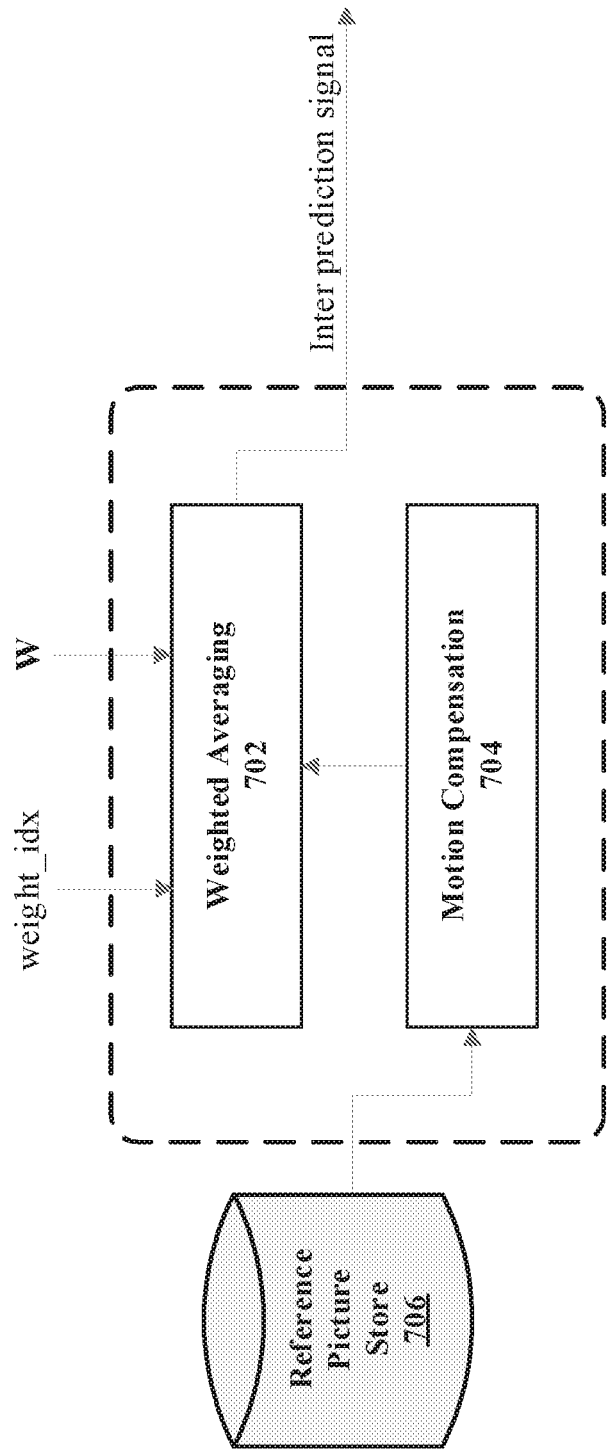
FIG. 7 is a diagram of an example module with support for bi-prediction with CU weights for a decoder.

FIG. 7 is a diagram of an example module with support for bi-prediction with CU weights for a decoder. FIG. 7 illustrates a block diagram of a prediction module 700. The prediction module 700 may be employed in a motion prediction module of a decoder, such as the motion prediction module 608. The prediction module 700 may be used in connection with BCW. The prediction module 700 may include a weighted averaging module 702 and a motion compensation module 704, which may receive one or more references pictures from a reference picture store 706. The prediction module 700 may use the block motion information and weight value to compute a prediction signal of BCW as a weighted average of (e.g., two) motion compensated prediction blocks.

Bi-prediction in video coding may be based on a combination of multiple (e.g., two) temporal prediction blocks. In examples, CU and block may be used interchangeably. The temporal prediction blocks may be combined. In an example, two temporal prediction blocks that are obtained from the reference pictures that are reconstructed may be combined using averaging. Bi-prediction may be based on block-based motion compensation. A relatively small motion may be observed between the (e.g., two) prediction blocks in bi-prediction.

Bi-directional optical flow (BDOF) may be used, for example, to compensate the relatively small motion observed between prediction blocks. BDOF may be applied to compensate for such motion for a sample inside a block. In an example, BDOF may compensate for such motion for individual samples inside a block. This may increase the efficiency of motion compensated prediction.

BDOF may include refining motion vector(s) associated with a block. In examples, BDOF may include sample-wise motion refinement that is performed on top of block-based motion-compensated predictions when bi-prediction is used. BDOF may include deriving refined motion vector(s) for a sample. As an example of BDOF, the derivation of the refined motion vector for individual samples in a block may be based on the optical flow model.

BDOF may include refining a motion vector of a sub-block associated with a block based on one or more of the following: a location in a block; gradients (e.g., horizontal, vertical, and/or the like) associated with the location in the block; sample values associated with a corresponding reference picture list for the location; and/or the like. Eq. 3 may be used for deriving refined motion vector for a sample. As shown in Eq. 3, $I^{(k)}$ (x, y) may denote the sample value at the coordinate (x, y) of the prediction block, derived from the reference picture list k (k=0, 1). $\partial I^{(k)}(x, y)/\partial x$ and $\partial I^{(k)}(x, y)/\partial y$ may be the horizontal and vertical gradients of the sample. The motion refinement $(v_x, v_y)$ at (x, y) may be derived using Eq. 3. Eq. 3 may be based on an assumption that the optical flow model is valid.

$$\frac{\partial I^{(k)}(x, y)}{\partial t} + v_x \cdot \frac{\partial I^{(k)}(x, y)}{\partial x} + v_y \frac{\partial I^{(k)}(x, y)}{\partial y} = 0 \quad \text{Eq. 3}$$

Figure 8:
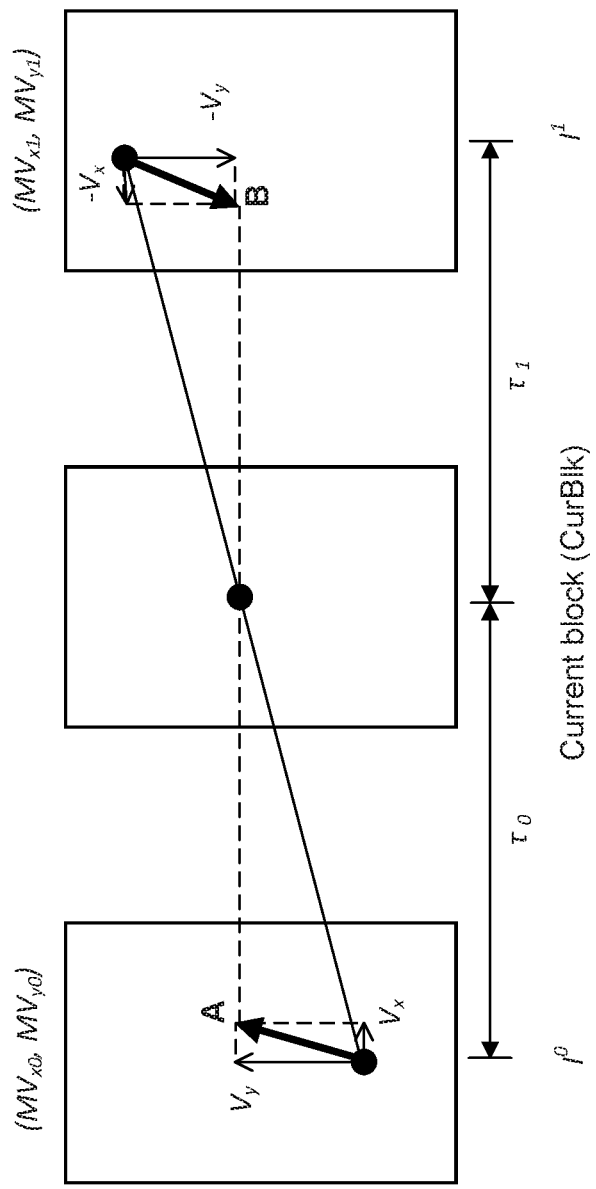
FIG. 8 illustrates an example bidirectional optical flow.

FIG. 8 illustrates an example bidirectional optical flow. In FIG. 8, $(MV_{x0}, MV_{y0})$ and $(MV_{x1}, MV_{y1})$ may indicate block-level motion vectors. The block-level motion vectors may be used to generate prediction blocks $I^{(0)}$ and IM. The motion refinement parameters $(v_x, v_y)$ at the sample location (x, y) may be calculated, for example, by minimizing the difference $\Delta$ between the motion vector values of the sample(s) after motion refinement (e.g., motion vector between the current picture and the backward reference picture A and motion vector between the current picture and the forward reference picture B in FIG. 8). The difference $\Delta$ between the motion vector values of the samples after motion refinement may be calculated using, for example, Eq. 4.

$$\Delta(x, y) = I^{(0)}(x, y) - I^{(1)}(x, y) + \\ v_x \left( \frac{\partial I^{(1)}(x, y)}{\partial x} + \frac{\partial I^{(0)}(x, y)}{\partial x} \right) + v_y \left( \frac{\partial I^{(1)}(x, y)}{\partial y} + \frac{\partial I^{(0)}(x, y)}{\partial y} \right) \quad \text{Eq. 4}$$

It may be assumed that the motion refinement is consistent for the samples, for example inside one unit (e.g., a 4×4 block). Such assumption may support the regularity of the derived motion refinement. The value of $(v_x^*, v_y^*)$ may be derived, for example, by minimizing $\Delta$ inside the 6×6 window $\Omega$ around each 4×4 block, as shown in Eq. 5.

$$(v_x^*, v_y^*) = \underset{(v_x, v_y)}{\arg\min} \sum_{(i,j) \in \Omega} \Delta^2(i, j) \quad \text{Eq. 5}$$

In examples, BDOF may include a progressive technique which may optimize the motion refinement in the horizontal direction (e.g., first) and in the vertical direction (e.g., second), e.g., to be used in association with Eq. 5. This may result in Eq. 6.

$$v_x = (S_1 + r) > m?\text{clip3}(-th_{BIO}, th_{BIO}, -(S_3 >> \lfloor \log_2 (S_1 + r) \rfloor)) : 0$$

$$v_y = (S_5 + r) > m?\text{clip3}(-th_{BIO}, th_{BIO}, -((S_6 - v_x S_2) >> \lfloor \log_2 (S_5 + r) \rfloor)) : 0 \quad \text{Eq. 6}$$

where $\lfloor \cdot \rfloor$ may be the floor function that outputs the greatest value that is less than or equal to the input. $th_{BIO}$ may be the motion refinement value (e.g., threshold value) to prevent the error propagation, e.g., due to coding noise and irregular local motion. As an example, the motion refinement value may be $2^{18-BD}$. The values of $S_1$, $S_2$, $S_3$, $S_5$ and $S_6$ may be calculated, for example, as shown in Eq. 7 and Eq. 8

$$S_1 = \sum_{(i,j) \in \Omega} \psi_x(i,j) \cdot \psi_x(i,j),$$

$$S_3 = \sum_{(i,j) \in \Omega} \theta(i,j) \cdot \psi_x(i,j) \cdot 2^L$$

$$S_2 = \sum_{(i,j) \in \Omega} \psi_x(i,j) \cdot \psi_y(i,j)$$

$$S_5 = \sum_{(i,j) \in \Omega} \psi_y(i,j) \cdot \psi_y(i,j) \cdot 2$$

$$S_6 = \sum_{(i,j) \in \Omega} \theta(i,j) \cdot \psi_y(i,j) \cdot 2^{L+1} \quad \text{Eq. 7}$$

where $$\psi_x(i, j) = \frac{\partial I^{(1)}}{\partial x}(i, j) + \frac{\partial I^{(0)}}{\partial x}(i, j)$$

$$\psi_y(i, j) = \frac{\partial I^{(1)}}{\partial y}(i, j) + \frac{\partial I^{(0)}}{\partial y}(i, j)$$

$$\theta(i, j) = I^{(1)}(i, j) - I^{(0)}(i, j) \quad \text{Eq. 8}$$

The BDOF gradients in Eq. 8 in the horizontal and vertical directions may be obtained by calculating the difference between multiple neighboring samples at a sample position of the L0/L1 prediction block. In an example, the difference may be calculated between two neighboring samples horizontally or vertically depending on the direction of the gradient being derived at one sample position of each L0/L1 prediction block, for example, using Eq. 9.

$$\frac{\partial I^{(k)}}{\partial x}(i, j) = (I^{(k)}(i+1, j) - I^{(k)}(i-1, j)) \gg 4$$

$$\frac{\partial I^{(k)}}{\partial y}(i, j) = (I^{(k)}(i, j+1) - I^{(k)}(i, j-1)) \gg 4$$

$$k = 0, 1 \quad \text{Eq. 9}$$

In Eq. 7, L may be the bit-depth increase for the internal BDOF, e.g., to keep data precision. L may be set to 5. The regulation parameters r and m in Eq. 6 may be defined as shown in Eq. 10 (e.g., to avoid division by a smaller value).

$$r = 500 \cdot 4^{BD-8}$$

$$m = 700 \cdot 4^{BD-8} \quad \text{Eq. 10}$$

BD may be the bit depth of the input video. The bi-prediction signal (e.g., final bi-prediction signal) of the current CU may be calculated by interpolating the L0/L1 prediction samples along the motion trajectory, e.g., based on the optical flow Eq. 3 and the motion refinement derived by Eq. 6. The bi-prediction signal of the current CU may be calculated using Eq. 11.

$$pred_{BIO}(x, y) = (I^{(0)}(x, y) + I^{(1)}(x, y) + b + o_{offset}) \gg \text{shift} \quad \text{Eq. 11}$$

$$b = rnd\left(\left(v_x\left(\frac{\partial I^{(1)}(x, y)}{\partial x} - \frac{\partial I^{(0)}(x, y)}{\partial x}\right)\right)/2^{L+1}\right) +$$

$$rnd\left(\left(v_y\left(\frac{\partial I^{(1)}(x, y)}{\partial y} - \frac{\partial I^{(0)}(x, y)}{\partial y}\right)\right)/2^{L+1}\right)$$

shift and $o_{offset}$ may be the offset and right shift that is applied to combine the L0 and L1 prediction signals for bi-prediction, which may be set equal to 15−BD and 1<< (14−BD)+2·(1<<13), respectively; rnd(.) may be a rounding function that rounds the input value to the closest integer value.

There may be various types of motions within a particular video, such as zoom in/out, rotation, perspective motions and other irregular motions. A translational motion model and/or an affine motion model may be applied for MCP. The affine motion model may be four-parameter and/or six-parameter. A first flag for (e.g., each) inter coded CU may be signaled to indicate whether the translational motion model or the affine motion model is applied for inter prediction. If the affine motion model is applied, a second flag may be sent to indicate whether the model is four-parameter or six-parameter.

The four-parameter affine motion model may include two parameters for translation movement in the horizontal and vertical directions, one parameter for a zoom motion in the horizontal and vertical directions and/or one parameter for a rotation motion in the horizontal and vertical directions. A horizontal zoom parameter may be equal to a vertical zoom parameter. A horizontal rotation parameter may be equal to a vertical rotation parameter. The four-parameter affine motion model may be coded using two motion vectors at two control point positions defined at the top-left and top right corners of a (e.g., current) CU.

Figure 9:
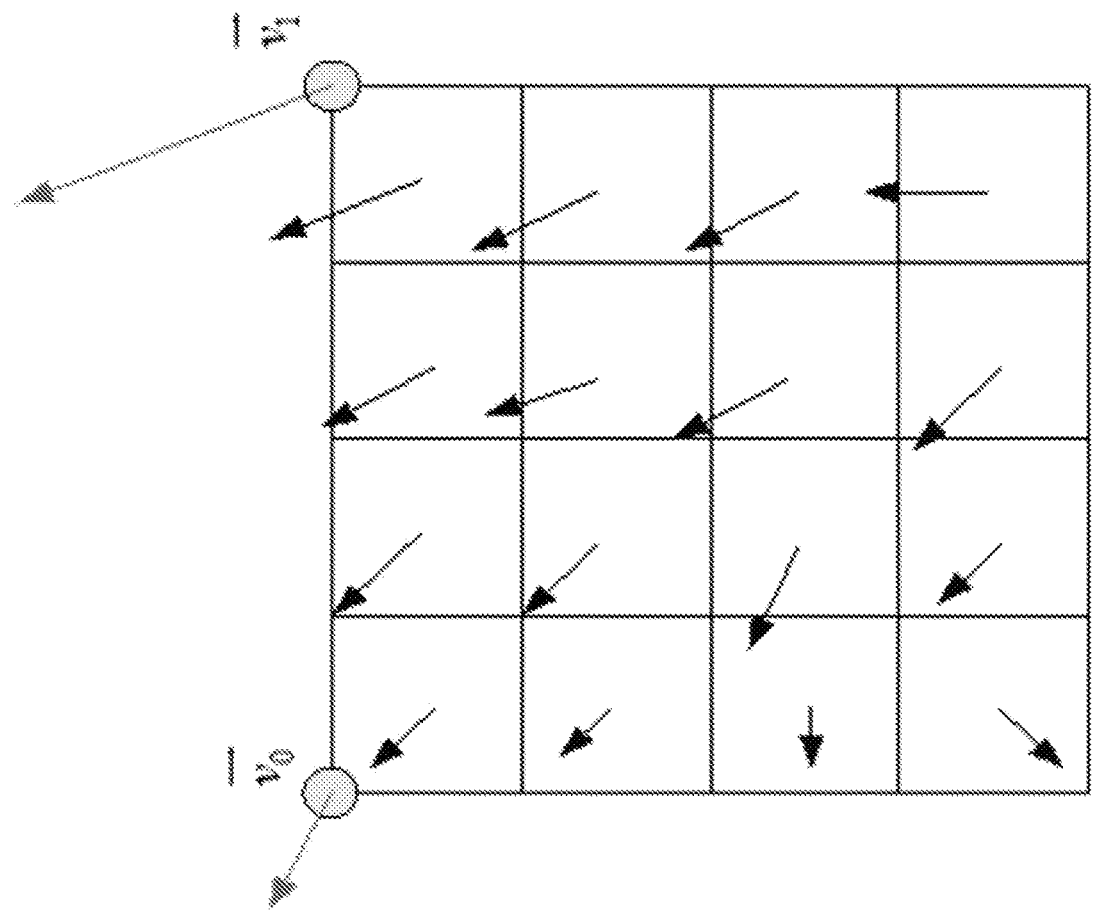
FIG. 9 illustrates an example four-parameter affine mode.
Figure 9:
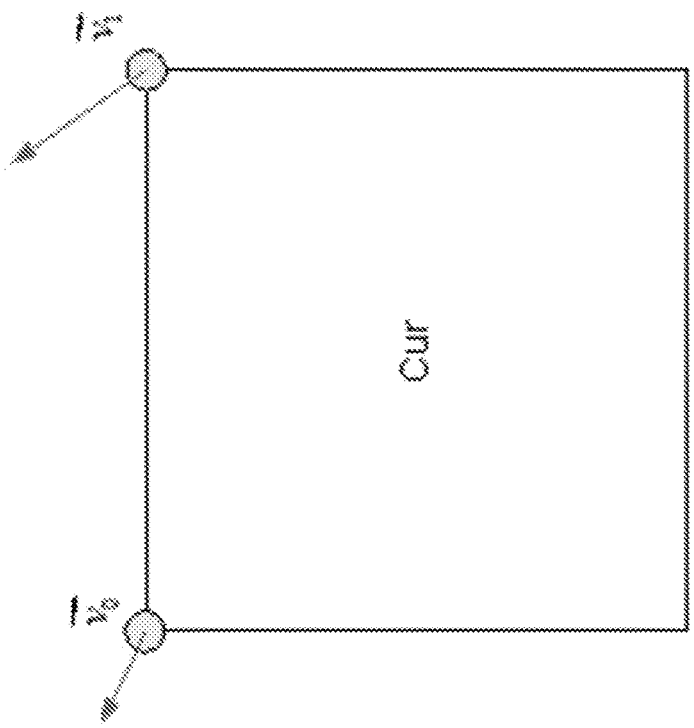

FIG. 9 illustrates an example four-parameter affine mode. FIG. 9 illustrates an example affine motion field of a block. As shown in FIG. 9, the block may be described by two control point motion vectors ($V_0$, $V_1$). Based on a control point motion, the motion field ($v_x$, $v_y$) of one affine coded block may be described in Eq. 12.

$$v_x = \frac{(v_{1x} - v_{0x})}{w}x - \frac{(v_{1y} - v_{0y})}{w}y + v_{0x}$$

$$v_y = \frac{(v_{1y} - v_{0y})}{w}x + \frac{(v_{1x} - v_{0x})}{w}y + v_{0y} \quad \text{Eq. 12}$$

In Eq. 12, ($v_{0x}$, $v_{0y}$) may be a motion vector of the top-left corner control point. ($v_{1x}$, $v_{1y}$) may be a motion vector of the top-right corner control point. w may be the width of CU. The motion field of an affine coded CU may be derived at a 4×4 block level. For example, ($v_x$, $v_y$) may be derived for each of the 4×4 blocks within a current CU and applied to a corresponding 4×4 block.

The four parameters may be estimated iteratively. The motion vector pairs at step k may be denoted as $\{(v_{0x}^k, v_{0y}^k), (v_{1x}^k, v_{1y}^k)\}$, the original luminance signal as $I(i,j)$, and the prediction luminance signal as $I'_k(i,j)$. The spatial gradient $g_x^k(i,j)$ and $g_y^k(i,j)$ may be derived using a Sobel filter applied on the prediction signal $I'_k(i,j)$ in the horizontal and vertical directions, respectively. The derivative of Eq. 1 may be represented as Eq. 13.

$$\begin{cases} dv_x^k(x, y) = c*x - d*y + a \\ dv_y^k(x, y) = d*x + c*y + b \end{cases} \quad \text{Eq. 13}$$

In Eq. 13, (a, b) may be delta translational parameters and (c, d) may be delta zoom and rotation parameters at step k. The delta MV at control points may be derived with its coordinates as Eq. 14 and Eq. 15. For example, (0, 0), (w, 0) may be coordinates for top-left and top-right control points, respectively.

$$\begin{cases} dv_{0x}^k = v_{0x}^{k+1} - v_{0x}^k = a \\ dv_{0y}^k = v_{0y}^{k+1} - v_{0y}^k = b \end{cases} \quad \text{Eq. 14}$$

$$\begin{cases} dv_{1x}^k = (v_{1x}^{k+1} - v_{1x}^k) = c*w + a \\ dv_{1y}^k = (v_{1y}^{k+1} - v_{1y}^k) = d*w + b \end{cases} \quad \text{Eq. 15}$$

Based on an optical flow equation, the relationship between the change of luminance and the spatial gradient and temporal movement may be formulated as Eq. 16.

$$I'_k(i,j) - I(i,j) = g_x^k(i,j)*dv_x^k(i,j) + g_y^k(i,j)*dv_y^k(i,j) \quad \text{Eq. 16}$$

Substituting $dv_x^k(i,j)$ and $dv_y^k(i,j)$ with Eq. 13 may produce Eq. 17 for parameters (a, b, c, d).

$$I'_k(i,j) - I(i,j) = (g_x^k(i,j)*i + g_y^k(i,j)*j)*c + (-g_x^k(i,j)*j + g_y^k(i,j)*i)*d + g_x^k(i,j)*a + g_y^k(i,j)*b \quad \text{Eq. 17}$$

If the samples in the CU satisfy Eq. 17, the parameter set (a, b, c, d) may be derived using, for example, the least square calculation. The motion vectors at two control points $\{(v_{0x}^{k+1}, v_{0y}^{k+1}), (v_{1x}^{k+1}, v_{1y}^{k+1})\}$ at step (k+1) may be derived with Eqs. 14 and 15, and they may be rounded to a specific precision (e.g., ¼ pel). Using the iteration, the motion vectors at two control points may be refined until it converges when parameters (a, b, c, d) may be zeros or the iteration times meet a pre-defined limit.

Figure 10:
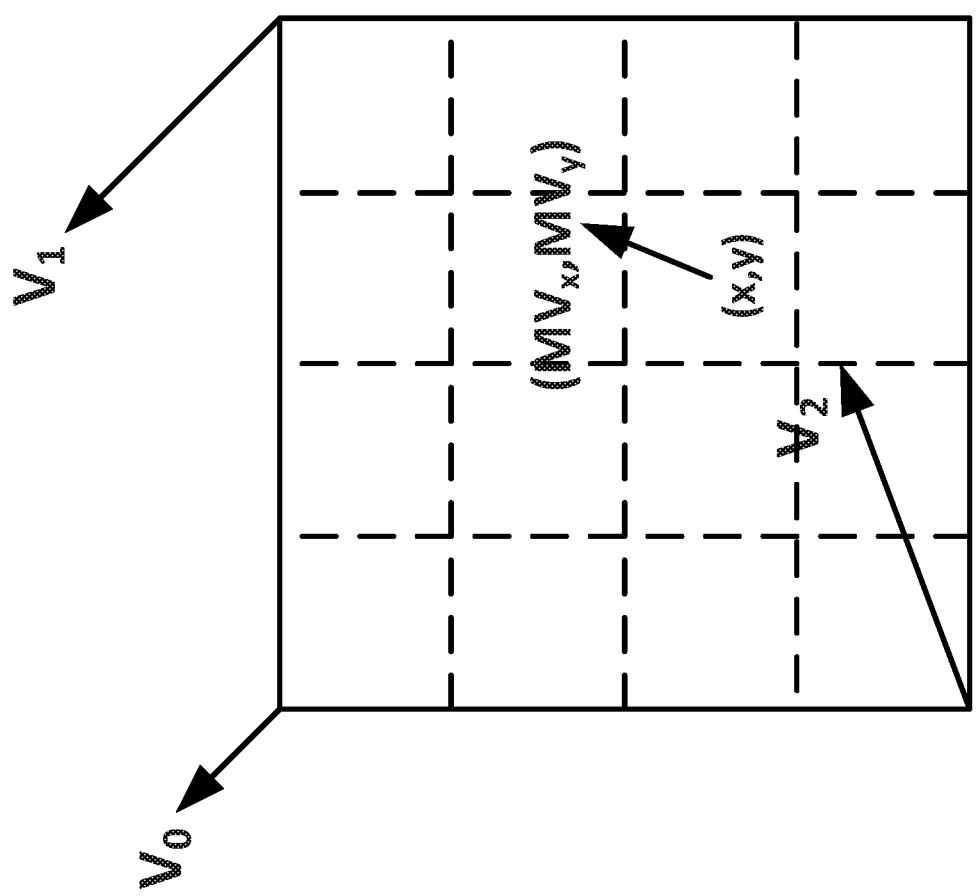
FIG. 10 illustrates an example six-parameter affine mode.

The six-parameter affine motion model may include two parameters for translation movement in the horizontal and vertical directions, one parameter for a zoom motion, one parameter for a rotation motion in the horizontal direction, one parameter for a zoom motion and/or one parameter for a rotation motion in the vertical direction. The six-parameter affine motion model may be coded with three motion vectors at three control points. FIG. 10 illustrates an example six-parameter affine mode. As shown in FIG. 10, three control points for the six-parameter affine coded CU may be defined at the top-left, top-right and/or bottom left corners of CU. The motion at the top-left control point may be related to a translational motion. The motion at the top-right control point may be related to rotation and zoom motions in the horizontal direction. The motion at the bottom-left control point may be related to rotation and zoom motions in the vertical direction. In the six-parameter affine motion model, the rotation and zoom motions in the horizontal direction may not be same as those motions in the vertical direction. In an example, the motion vector of each sub-block ($v_x$, $v_y$) may be derived from Eqs. 18 and 19 using three motion vectors as control points:

$$v_x = v_{0x} + (v_{1x} - v_{0x})*\frac{x}{w} + (v_{2x} - v_{0x})*\frac{y}{h} \quad \text{Eq. 18}$$

$$v_y = v_{0y} + (v_{1y} - v_{0y})*\frac{x}{w} + (v_{2y} - v_{0y})*\frac{y}{h} \quad \text{Eq. 19}$$

In Eqs. 18 and 19, $(v_{2x}, v_{2y})$ may be a motion vector of the bottom-left control point. (x, y) may be a center position of a sub-block. w and h may be a width and height of a CU.

The six parameters of the six-parameter affine model may be estimated, for example, in a similar way. For example, Eq. 20 may be produced based on Eq. 13.

$$\begin{cases} dv_x^k(x, y) = c*x + d*y + a \\ dv_y^k(x, y) = e*x + f*y + b \end{cases} \quad \text{Eq. 20}$$

In Eq. 20, for step k, (a, b) may be delta translation parameters. (c, d) may be delta zoom and rotation parameters for the horizontal direction. (e, f) may be delta zoom and rotation parameters for the vertical direction. For example, Eq. 21 may be produced based on Eq. 16.

$$I'_k(i,j) - I(i,j) = (g_x^k(i,j)*i)*c + (g_x^k(i,j)*j)*d + (g_y^k(i,j)*i)* \\ e + (g_y^k(i,j)*j)*f + g_x^k(i,j)*a + g_y^k(i,j)*b \quad \text{Eq. 21}$$

The parameter set (a, b, c, d, e, f) may be derived using the least square calculation by considering the samples within the CU. The motion vector of the top-left control point $(v_{0x}^{k+1}, v_{0y}^{k+1})$ may be calculated using Eq. 14. The motion vector of the top-right control point $(v_{1x}^{k+1}, v_{1y}^{k+1})$ may be calculated using Eq. 22. The motion vector of the top-right control point $(v_{2x}^{k+1}, v_{2y}^{k+1})$ may be calculated using Eq. 23.

$$\begin{cases} dv_{1x}^k = (v_{1x}^{k+1} - v_{1x}^k) = c*w + a \\ dv_{1y}^k = (v_{1y}^{k+1} - v_{1y}^k) = e*w + b \end{cases} \quad \text{Eq. 22}$$

$$\begin{cases} dv_{2x}^k = (v_{2x}^{k+1} - v_{2x}^k) = d*h + a \\ dv_{2y}^k = (v_{2y}^{k+1} - v_{2y}^k) = f*h + b \end{cases} \quad \text{Eq. 23}$$

There may be a symmetric MV difference for bi-prediction. In some examples, the motion vector in forward reference picture and backward reference picture may be symmetric, e.g., due to the continuity of motion trajectory in bi-prediction.

SMVD may be an inter coding mode. With SMVD, the MVD of a first reference picture list (e.g., reference picture list 1) may be symmetric to the MVD of a second reference picture list (e.g., reference picture list 0). The motion vector coding information (e.g., MVD) of one reference picture list may be signaled, and the motion vector information of another reference picture list may not be signaled. The motion vector information of another reference picture list may be determined, for example, based on the signaled motion vector information and that the motion vector information of the reference pictures lists is symmetric. In an example, the MVD of reference picture list 0 may be signaled and the MVD of List 1 may not be signaled. The MV coded with this mode may be calculated using Eq. 24A.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad \text{Eq. 24A}$$

where the subscripts indicate the reference picture list 0 or 1, x indicates horizontal direction and y indicates vertical direction.

Figure 11:
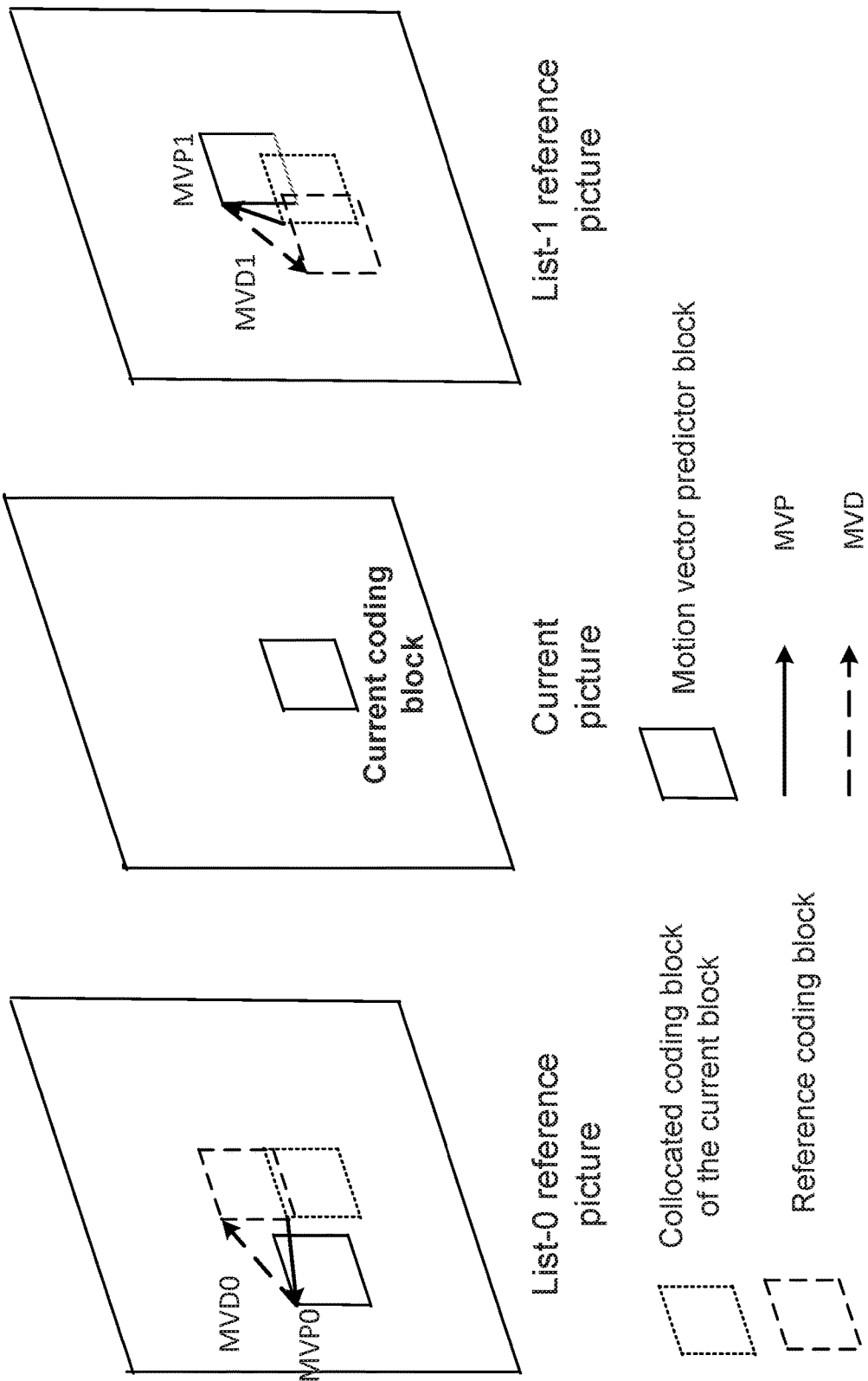
FIG. 11 illustrates an example non-affine motion symmetric MVD (e.g., MVD1=−MVD0).

As shown in Eq. 24A, an MVD for the current coding block may indicate a difference between an MVP for the current coding block and an MV for the current coding block. A person of skilled in the art would appreciate that an MVP may be determined based on an MV of a spatial neighboring block(s) of the current coding block and/or a temporal neighboring block for the current coding block. Eq. 24A may be illustrated in FIG. 11. FIG. 11 illustrates an example non-affine motion symmetric MVD (e.g., MVD1=−MVD0). As shown in Eq. 24A and illustrated in FIG. 11, the MV of a current coding block may be equal to the sum of the MVP for the current coding block and the MVD of the current coding block (or negative MVD depending on the reference picture list). As shown in Eq. 24A and illustrated in FIG. 11, the MVD of reference picture list 1 (MVD1) may be equal to negative of the MVD of reference picture list 0 (MVD0) for SMVD. The MV predictor (MVP) of reference picture list 0 (MVP0) may or may not be symmetric to the MVP of reference picture list 1 (MVP1). The MVP0 may or may not be equal to negative of the MVP1. As shown in Eq. 24A, the MV of a current coding block may be equal to the sum of the MVP for the current coding block and the MVD of the current coding block. The MV of reference picture list 0 (MV0) may not be equal to negative of the MV of reference picture list 1 (MV1) based on Eq. 24A. The MV of reference picture list 0 MV0 may or may not be symmetric to the MV of reference picture list 1 MV1.

SMVD may be available for bi-prediction in the case that: reference picture list 0 includes a forward reference picture and reference picture list 1 includes a backward reference picture; or reference picture list 0 includes a backward reference picture and reference picture list 1 includes a forward reference picture.

With SMVD, the reference picture indices of reference picture list 0 and list 1 may not be signaled. They may be derived as follows. If reference picture list 0 includes a forward reference picture and reference picture list 1 includes a backward reference picture, the reference picture index in list 0 may be set to the nearest forward reference picture to the current picture, and, the reference picture index of list 1 may be set to the nearest backward reference picture to the current picture. If reference picture list 0 includes a backward reference picture and reference picture list 1 includes a forward reference picture, the reference picture index in list 0 may be set to the nearest backward reference picture to the current picture, and, the reference picture index of list 1 may be set to the nearest forward reference picture to the current picture.

For SMVD, a reference picture index may not need to be signaled for either list. One set of MVD for one reference picture list (e.g. list 0) may be signaled. Signaling overhead may be reduced for bi-prediction coding.

In a merge mode, motion information may be derived and/or be used (e.g., directly used) to generate the prediction samples of the current CU. A merge mode with motion vector difference (MMVD) may be used. A merge flag may be signaled to specify whether MMVD is used for a CU. A MMVD flag may be signaled after sending a skip flag.

In MMVD, after a merge candidate is selected, the merge candidate may be refined by MVD information. The MVD information may be signaled. The MVD information may include one or more of a merge candidate flag, a distance index to specify motion magnitude, and/or an index for indication of motion direction. In MMVD, one of multiple candidates (e.g., the first two) candidates in the merge list may be selected to be used as the MV basis. The merge candidate flag may indicate which candidate is used.

Figure 12:
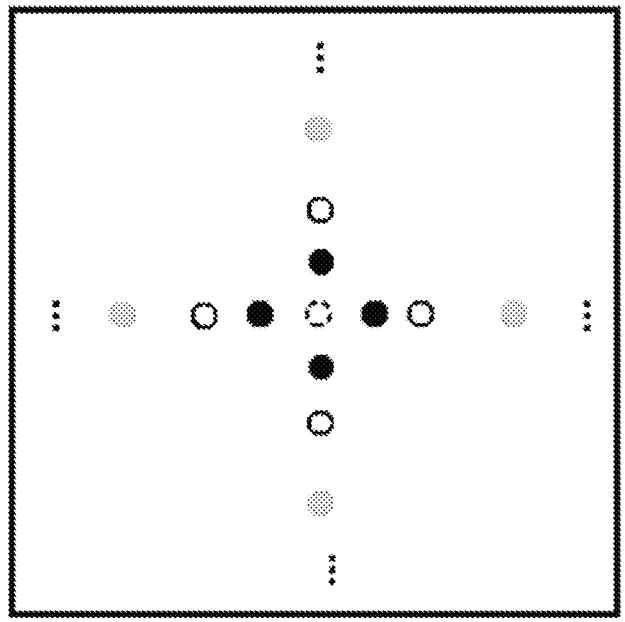
FIG. 12 illustrates an example motion vector difference (MVD) search point(s) (e.g., for merge mode MVD).
Figure 12:
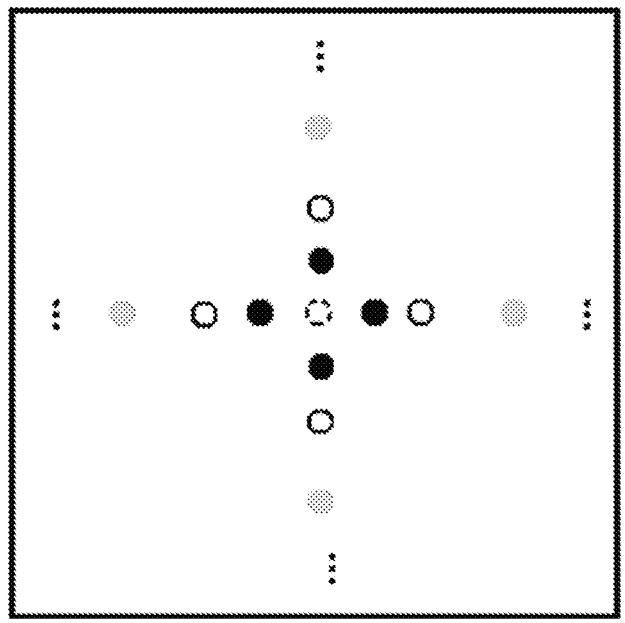

The distance index may specify motion magnitude information and/or may indicate a pre-defined offset from the starting point (e.g., from the candidate selected to be the MV basis). FIG. 12 illustrates an example motion vector difference (MVD) search point(s). As shown in FIG. 12, the center points may be the starting point MVs. As shown in FIG. 12, the patterns in the dots may indicate different searching orders (e.g., from dots nearest the center MVs to the ones further away from the center MVs). As shown in FIG. 12, an offset may be added to the horizontal component and/or vertical component of the starting point MV. Example relation of distance index and pre-defined offset is shown in Table 1.

TABLE 1

Example relation of distance index and pre-defined offset

| Distance IDX | 0 | 1 | 2 | 3 | 4 | 5 | 6 | 7 |
|---|---|---|---|---|---|---|---|---|
| Offset (e.g., in unit of luma sample) | ¼ | ½ | 1 | 2 | 4 | 8 | 16 | 32 |

The direction index may represent the direction of the MVD relative to the starting point. The direction index may represent any of the four directions as shown in Table 2. The meaning of MVD sign may vary according to the information of the starting point MV or MVs. When the starting point has a uni-prediction MV or a pair of bi-prediction MVs with both lists pointing to the same side of the current picture, the sign in Table 2 may specify the sign of the MV offset added to the starting MV or MVs. For example, when the picture order counts (POCs) of two references are both larger than the POC of the current picture, or are both smaller than the POC of the current picture, the sign may specify the sign of the MV offset added to the starting MV or MVs. When the starting point has a pair of bi-prediction MVs with both lists pointing to the different sides of the current picture (e.g., when the POC of one reference is larger than the POC of the current picture, and the POC of the other reference is smaller than the POC of the current picture), the sign in Table 2 may specify the sign of MV offset added to the list0 MV component of the starting point MV, and the sign of the MV offset added to the list1 MV may have the opposite value.

TABLE 2

Example sign of MV offset specified by direction index

| Direction IDX | 00 | 01 | 10 | 11 |
|---|---|---|---|---|
| x-axis | + | − | N/A | N/A |
| y-axis | N/A | N/A | + | − |

A symmetric mode for bi-prediction coding may be used. One or more features described herein may be used in association with the symmetric mode for bi-prediction coding, e.g., which, in examples, may increase coding efficiency and/or reduce complexity. The symmetric mode may include SMVD. One or more features described herein may be associated with synergizing SMVD with one or more other coding tools, e.g., bi-prediction with CU weights (BCW or BPWA), BDOF, and/or affine mode. One or more features described herein may be used in encoding (e.g., encoder optimization), which may include fast motion estimation for translational and/or affine motion.

SMVD coding features may include one or more of restrictions, signaling, SMVD search features, and/or the like.

The application of SMVD mode may be based on the CU size. For example, a restriction may disallow the SMVD for a relatively small CU (e.g., a CU having an area that is no greater than 64). A restriction may disallow the SMVD for a relatively large CU (e.g., a CU bigger than 32×32). If a restriction disallows the SMVD for a CU, symmetric MVD signaling may be skipped or disabled for the CU, and/or a coding device (e.g., an encoder) may not search symmetric MVD.

The application of SMVD mode may be based on the POC distances between the current picture and reference pictures. The coding efficiency of SMVD may decrease for relatively large POC distance (e.g., POC distance greater than or equal to 8). SMVD may be disabled if the POC distance between a reference picture (e.g., any reference picture) to the current picture is relatively large. If SMVD is disabled, the symmetric MVD signaling may be skipped or disabled, and/or a coding device (e.g., an encoder) may not search symmetric MVD.

The application of SMVD mode may be restricted to one or more temporal layers. In an example, a lower temporal layer may refer to reference pictures that have larger POC distance from the current picture, with a hierarchical GOP structure. The coding efficiency of the SMVD may decrease for a lower temporal layer. SMVD coding may be disallowed for relatively low temporal layers (e.g., temporal layer 0 and 1). If SMVD is disallowed, the symmetric MVD signaling may be skipped or disabled, and/or a coding device (e.g., an encoder) may not search symmetric MVD.

In SMVD coding, the MVD of one of the reference picture lists may be signaled (e.g., explicitly signaled). In an example, a coding device (e.g., a decoder) may parse a first MVD associated with a first reference picture list in a bitstream. The coding device may determine a second MVD associated with a second reference picture list based on the first MVD and that the first MVD and the second MVD are symmetric to each other.

The coding device (e.g., the decoder) may identify the MVD of which reference picture list is signaled, for example, whether the MVD of reference picture list 0 or reference picture list 1 is signaled. In examples, the MVD of reference picture list 0 may be signaled (e.g., always signaled). The MVD of reference picture list 1 may be obtained (e.g., derived).

The reference picture list whose MVD is signaled (e.g., explicitly signaled) may be selected. One or more of the following may apply. An indication (e.g., a flag) may be signaled to indicate which reference picture list is selected. The reference picture list with a smaller POC distance to a current picture may be selected. If the POC distances for the reference picture lists are the same, a reference picture list may be predetermined to break the tie. For example, reference picture list 0 may be selected if the POC distances for the reference picture lists are the same.

The MVP index for a reference picture list (e.g., one reference picture list) may be signaled. In some examples, the indices of MVP candidates for both reference picture lists may be signaled (e.g., explicitly signaled). The MVP index for a reference picture list may be signaled (e.g., only the MVP index for one reference picture list), for example to reduce signaling overhead. The MVP index for the other reference picture list may be derived, for example as described herein. LX may be the reference picture list whose MVP index is signaled (e.g., explicitly signaled), and i may be the signaled MVP index. mvp' may be derived from the MVP of LX as shown in Eq. 24.

$$ (mvpx', mvpy') = \left( mvpx_{i,LX} \times \frac{POC_{1-LX} - POC_{curr}}{POC_{LX} - POC_{curr}}, mvpy_{i,LX} \times \frac{POC_{1-LX} - POC_{curr}}{POC_{LX} - POC_{curr}} \right) $$

Eq. 24 where $POC_{LX}$, $POC_{1-LX}$ and $POC_{curr}$ may be the POC of list LX reference picture, list (1-LX) reference picture, and current picture, respectively. And from the reference picture list (1-LX)'s MVP list, the MVP that is closest to mvp' may be selected, e.g., as shown in Eq. 25, $$j = \underset{j}{\arg\min}(|mvpx_{j,1-LX} - mvpx'| + |mvpy_{j,1-LX} - mvpy'|) \quad \text{Eq. 25}$$

where j may be the MVP index of reference picture list (1-LX). LX may be the reference picture list whose MVD is signaled (e.g., explicitly signaled).

Table 3 shows an example CU syntax that may support symmetric MVD signaling for a non-affine coding mode.

TABLE 3

| Example coding unit syntax that may support SMVD | |
|---|---|
| coding_unit( x0, y0, cbWidth, cbHeight, treeType ) { | Descriptor |
| ... | |
|   if( slice_type = = B ) | |
|     inter_pred_idc[ x0 ][ y0] | ae(v) |
|   if( sps_affine_enabled_flag && cbWidth >= 16 && cbHeight >= 16 ) { | |
|     inter_affine_flag[ x0 ][ y0 ] | ae(v) |
|     if( sps_affine_type_flag && inter_affine_flag[ x0 ][ y0 ] ) | |
|       cu_affine_type_flag[ x0 ][ y0 ] | ae(v) |
|   } | |
|   if( inter_pred_idc[ x0 ][ y0 ] == PRED_BI && | |
|     refIdxSymL0 > −1 && refIdxSymL1 > −1 && inter_affine_flag[ x0 ][ y0 ] == 0 ) | |
|     sym_mvd_flag[ x0 ][y0 ] | ae(v) |
|   if( inter_pred_idc[ x0 ][ y0] != PRED_L1 ) { | |
|     if( num_ref_idx_l0_active_minus1 > 0 && !sym_mvd_flag[ x0 ][ y0 ] ) | |
|       ref_idx_l0[ x0 ][ y0 ] | ae(v) |
|     mvd_coding( x0, y0, 0, 0 ) | |
|     if( MotionModelIdc[ x0 ][ y0] > 0 ) | |
|       mvd_coding( x0, y0, 0, 1 ) | |
|     if(MotionModelIdc[ x0 ][ y0] > 1 ) | |
|       mvd_coding( x0, y0, 0, 2 ) | |
|     mvp_l0_flag[ x0 ][ y0 ] | ae(v) |
|   } else { | |
|     MvdL0[ x0 ][ y0 ][ 0 ] = 0 | |
|     MvdL0[ x0 ][ y0 ][ 1 ] = 0 | |
|   } | |
|   if( inter_pred_idc[ x0 ][ y0 ] != PRED_L0 ) { | |
|     if( num_ref_idx_l1_active_minus1 > 0 && !sym_mvd_flag[ x0 ][ y0 ] ) | |
|       ref_idx_l1[ x0 ][ y0 ] | ae(v) |
|     if( mvd_l1_zero_flag && inter_pred_idc[ x0 ][ y0 ] == PRED_BI ) { | |
|       ... | |
|     } else { | |
|       if( !sym_mvd_flag[ x0 ][ y0 ] ) { | |
|         mvd_coding( x0, y0, 1, 0 ) | |
|       if( MotionModelIdc[ x0 ][ y0 ] > 0 ) | |
|         mvd_coding( x0, y0, 1, 1 ) | |
|       if(MotionModelIdc[ x0 ][ y0 ] > 1 ) | |
|         mvd_coding( x0, y0, 1, 2 ) | |
|     } | |
|     mvp_l1_flag[ x0 ][ y0 ] | ae(v) |
|   } else { | |
|     MvdL1[ x0 ][ y0 ][ 0 ] = 0 | |
|     MvdL1[ x0 ][ y0 ][ 1 ] = 0 | |
|   } | |
|   ... | |
|   } | |
| } | |
| ... | |
| } | | refIdxSymL0 indication being set to −1 may indicate that SMVD is not applicable, and the sym_mvd_flag may be absent.

An indication, such as refIdxSymL1, may indicate the reference picture index in reference picture list 1. The refIdxSymL1 indication having a value of −1 may indicate that SMVD is not applicable, and the sym_mvd_flag may be absent.

In examples, SMVD may be applicable when reference picture list 0 includes a forward reference picture and reference picture list 1 includes a backward reference picture, or when reference picture list 0 includes a backward reference picture and reference picture list 1 includes a forward reference picture. Otherwise, SMVD may not be applicable. For example, when SMVD is not applicable, For example, an indication, such as the sym_mvd_flag flag may indicate whether SMVD is used in motion vector coding for the current coding block (e.g., bi-prediction coded CU).

An indication, such as refIdxSymL0, may indicate the reference picture index in reference picture list 0. The signaling of the SMVD indication (e.g., the sym_mvd_flag flag at the CU level), may be skipped. A coding device (e.g., a decoder) may perform one or more condition checks. As shown in Table 3, two condition checks may be performed (e.g. refIdxSymL0>−1 and refIdxSymL1>−1). The one or more condition checks may be performed to determine whether the SMVD indication is used. As shown in Table 3, two condition checks may be performed (e.g. refdxSymL0>−1 and refIdxSymL1>−1) to determine whether the SMVD indication is received. In an example, in order for a decoder to check these conditions, the decoder may wait for the construction of the reference picture lists of the current picture (e.g., list0 and list1) before certain CU parsing. In some instances, even if both of the two checked conditions (e.g. refIdxSymL0>−1 and refIdxSymL1>−1) are true, an encoder may not use the SMVD for the CU (e.g., to save the encoding complexity).

An SMVD indication may be at CU level and associated with a current coding block. The CU-level SMVD indication may be obtained based a higher level indication. In examples, the presence of the CU-level SMVD indication (e.g., the sym_mvd_flag flag), may be controlled (e.g., alternatively or additionally) by a higher level indication. and/or in any syntax level, where the reference picture lists are shared by CUs associated with the syntax level. For example, a slice level flag can be placed in the slice header. In an example, a coding device (e.g., a decoder) may receive a sequence-level SMVD indication indicating whether SMVD is enabled for a sequence of pictures. If SMVD is enabled for the sequence, the coding device may obtain an SMVD indication associated with the current coding block based on the sequence-level SMVD indication.

With the higher-level SMVD enablement indication, such as the sym_mvd_enabled_flag flag, the CU-level parsing may be performed without checking the one or more conditions (e.g., described herein). The SMVD can be enabled or disabled at the higher level than CU level (e.g. at the discretion of the encoder). Table 4 shows example syntax that may support SMVD mode.

TABLE 4

Example coding unit syntax that checks the high-level SMVD enabled indication

| coding_unit( x0, y0, cbWidth, cbHeight, treeType ) { | Descriptor |
|---|---|
| ... | |
|   if( slice_type = = B ) | |
|     inter_pred_idc[ x0 ][ y0 ] | ae(v) |
|   if( sps_affine_enabled_flag && cbWidth >= 16 && cbHeight >= 16 ) { | |
|     inter_affine_flag[ x0 ][ y0 ] | ae(v) |
|     if( sps_affine_type_flag && inter_affine_flag[ x0 ][ y0 ] ) | |
|       cu_affine_type_flag[ x0 ][ y0 ] | ae(v) |
|   } | |
|   if( inter_pred_idc[ x0 ][ y0 ] == PRED_BI && | |
|     sym_mvd_enabled_flag && inter_affine_flag[ x0 ][ y0 ] == 0 ) | |
|     sym_mvd_flag[ x0 ][ y0 ] | ae(v) |
|   if( inter_pred_idc[ x0 ][ y0 ] != PRED_L1 ) { | |
|     if( num_ref_idx_l0_active_minus1 > 0 && !sym_mvd_flag[ x0 ][ y0 ] ) | |
|       ref_idx_l0[ x0 ][ y0 ] | ae(v) |
|     mvd_coding( x0, y0, 0, 0 ) | |
|     if( MotionModelIdc[ x0 ][ y0 ] > 0 ) | |
|       mvd_coding( x0, y0, 0, 1 ) | |
|     if(MotionModelIdc[ x0 ][ y0 ] > 1 ) | |
|       mvd_coding( x0, y0, 0, 2 ) | |
|     mvp_l0_flag[ x0 ][ y0 ] | ae(v) |
|   } else { | |
|     MvdL0[ x0 ][ y0 ][ 0 ] = 0 | |
|     MvdL0[ x0 ][ y0 ][ 1 ] = 0 | |
|   } | |
|   if( inter_pred_idc[ x0 ][ y0 ] != PRED_L0 ) { | |
|     if( num_ref_idx_l1_active_minus1 > 0 && !sym_mvd_flag[ x0 ][ y0 ] ) | |
|       ref_idx_l1[ x0 ][ y0 ] | ae(v) |
|     if( mvd_l1_zero_flag && inte_pred_idc[ x0 ][ y0 ] == PRED_BI ) { | |
|       ... | |
|     } else{ | |
|       if( !sym_mvd_flag[ x0 ][ y0 ] ) { | |
|         mvd_coding( x0, y0, 1, 0 ) | |
|       if( MotionModelIdc[ x0 ][ y0 ] > 0 ) | |
|         mvd_coding( x0, y0, 1, 1 ) | |
|       if(MotionModelIdc[ x0 ][ y0 ] > 1 ) | |
|         mvd_coding( x0, y0, 1, 2 ) | |
|     } | |
|     mvp__l1_flag[ x0 ][ y0 ] | ae(v) |
|   } else { | |
|     MvdL1[ x0 ][ y0 ][ 0 ] = 0 | |
|     MvdL1[ x0 ][ y0 ][ 1 ] = 0 | |
|   } | |
|   } | |
| } | |
| ... | |
| } | |

For example, a SMVD enabled indication, such as the sym_mvd_enabled_flag flag may be signaled at the slice level, tile level, tile group level, or at the picture parameter set (PPS) level, at the sequence parameter set (SPS) level, There may be different ways for according device (e.g., an encoder) to determine whether to enable SMVD, and set the value of the sym_mvd_enabled_flag accordingly. One of more examples herein may be combined to determine whether to enable SMVD, and set the value of the sym_mvd_enabled_flag accordingly. For example, the encoder may determine whether to enable SMVD by checking the reference picture lists. If both forward and backward reference picture are present, the sym_mvd_enabled_flag flag may be set equal to true to enable SMVD. For example, the encoder may determine whether to enable SMVD based on the temporal distance(s) between the current picture and the forward and/or backward reference picture(s). When a reference picture is far away from current picture, SMVD mode may not be effective. If either the forward or backward reference picture is far away from the current picture, the encoder may disable SMVD. A coding device may set the value of the high-level SMVD enablement indication based on value (e.g., a threshold value) for temporal distances between a current picture and a reference picture. For example, to reduce the encoding complexity, the encoder may use (e.g., only use) the higher level control flag to enable SMVD for pictures having forward and backward reference pictures such that the maximum temporal distance of these two reference pictures to the current picture is smaller than a value (e.g., a threshold value). For example, the encoder may determine whether to enable SMVD based on a temporal layer (e.g., of the current picture). A relatively low temporal layer may indicate that the reference picture is far away from the current picture, and in that case SMVD may not be effective. The encoder may determine that the current picture belongs to a relatively low temporal layer (e.g., lower than a threshold, such as 1, 2), and may disable SMVD for such a current picture. For example, the sym_mvd_enabled_flag may be set to false to disable SMVD. For example, the encoder may determine whether to enable SMVD based on the statistics of previously coded pictures at the same temporal layer as the temporal layer of the current picture. The statistics may include the average POC distance for bi-prediction coded CUs (e.g., the average of the distance(s) between the current picture(s) and the temporal center of two reference pictures of the current picture(s)). R0, R1 may be the reference pictures for bi-prediction coded CU. poc(x) may be the POC of picture x. The POC distance distance ($CU_i$) of two reference pictures and current picture (current_picture) may be calculated using Eq. 26. The average POC distance for bi-prediction coded CUs AvgDist may be calculated using Eq. 27.

$$\text{Distance}(CU_i) = |2*\text{poc}(\text{current\_picture}) - \text{poc}(R0) - \text{poc}(R1)| \quad \text{Eq. 26}$$

$$\text{AvgDist} = \Sigma_{CU_i \in bi-pred} \text{Distance}(CU_i)/N \quad \text{Eq. 27}$$

Variable N may indicate the total number of bi-prediction coded CU's that may have both forward and backward reference pictures. As an example, if AvgDist is smaller than a value (e.g., a predefined threshold), sym_mvd_enabled_flag may be set by the encoder to true to enable SMVD; otherwise, sym_mvd_enabled_flag may be set to false to disable SMVD.

In some examples, MVD value(s) may be signaled. In some examples, a combination of direction index and distance index may be signaled, and MVD value(s) may not be signaled. Example direction table and example distance table as shown in Table 1 and Table 2 may be used for signaling and deriving the MVD information. For example, a combination of distance index 0 and direction index 0 may indicate MVD (½, 0).

A search for symmetric MVD may be performed, e.g., after uni-prediction search and bi-prediction search. A uni-prediction search may be used to search for an optimal MV pointing to a reference block for uni-prediction. A bi-prediction search may be used to search for two optimal MVs pointing to two reference blocks for bi-prediction. The search may be performed to find a candidate symmetric MVD, e.g., the best symmetric MVD. In an example, a set of search points may be iteratively evaluated, for the symmetric MVD search. An iteration may include evaluation of a set of search points. The set of search points may form a search pattern centered around, for example, a best MV of a previous iteration. For the first iteration, the search pattern may be centered around the initial MV. The selection of an initial MV may affect overall results. A set of initial MV candidates may be evaluated. The initial MV for the symmetric MVD search may be determined, for example, based on rate-distortion cost. In an example, the MV candidate with the lowest rate-distortion cost may be chosen to be the initial MV for the symmetric MVD search. The rate-distortion cost may be estimated, for example, by summing the bi-prediction error and the weighted rate of MVD coding for reference picture list 0. The set of initial MV candidates may include one or more of the MV(s) obtained from uni-prediction search, the MV(s) obtained from the bi-prediction search, and the MVs from the advanced motion vector predictor (AMVP) list. At least one MV may be obtained for each reference picture from uni-prediction search.

Early termination may be applied, e.g., to reduce complexity. Early termination may be applied (e.g., by an encoder) if bi-prediction cost is larger than a value (e.g., a threshold value). In examples, e.g., before initial MV selection, the search for symmetric MVD may be terminated if the rate-distortion cost for the MV obtained from the bi-prediction search is larger than a value (e.g., a threshold value). For example, the value may be set to a multiple of (e.g., 1.1 times) the uni-prediction cost. In examples, e.g., after initial MV selection, the symmetric MVD search may be terminated if the rate-distortion cost associated with the initial MV is higher than a value (e.g., a threshold value). For example, the value may be set to a multiple of (e.g., 1.1 times of) the lowest among uni-prediction cost and bi-prediction cost.

There may be interaction between SMVD mode and other coding tools. One or more of the following may be performed: symmetric affine MVD coding; combine SMVD with bi-prediction with CU weights (BCW or BPWA); or combine SMVD with BDOF.

Symmetric affine MVD coding may be used. Affine motion model parameters may be represented by control point motion vectors. 4-parameter affine model may be represented by two control point MVs and 6-parameter affine model may be represented by three control point MVs. An example shown in Eq. 12 may be a 4-parameter affine motion model represented by two control point MVs, e.g., the top-left control point MV (v0) and top-right control point MV (v). The top-left control point MV may represent the translational motion. The top-left control point MV may have corresponding symmetric MVs, for example, associated with forward and backward reference pictures following the motion trajectory. SMVD mode may be applied to the top-left control point. The other control point MVs may represent a combination of zoom, rotate, and/or shear mapping. SMVD may not be applied to the other control point MVs.

SMVD may be applied to the top-left control point (e.g., only to the top-left control point), and the other control point MVs may be set to their respective MV predictor(s).

An MVD of a control point associated with a first reference picture list may be signaled. An MVD(s) of a control point(s) associated with a second reference picture list(s) may be obtained based on the MVD of the control point associated with the first reference picture list and that the MVD of the control point associated with the first reference picture list is symmetric to an MVD of a control point associated with the second reference picture list. In examples, when symmetric affine MVD mode is applied, the MVD of a control point associated with reference picture list 0 may be signaled (e.g., only the control point MVD of reference picture list 0 may be signaled). MVDs of control points associated with reference picture list 1 may be derived based on the symmetric property. The MVDs of control points associated with reference picture list 1 may not be signaled.

The control point MVs associated with reference picture lists may be derived. The control point MVs for control point 0 (top-left) of reference picture list 0 and reference picture list 1, may be derived, for example, using Eq. 28.

$$\begin{cases} (mvx_{0,0}, mvy_{0,0}) = (mvpx_{0,0} + mvdx_{0,0}, mvpy_{0,0} + mvdy_{0,0}) \\ (mvx_{1,0}, mvy_{1,0}) = (mvpx_{1,0} - mvdx_{0,0}, mvpy_{1,0} - mvdy_{0,0}) \end{cases} \quad \text{Eq. 28}$$

Figure 13:
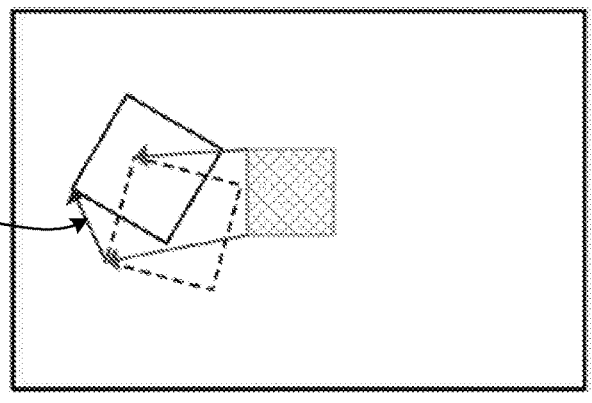
FIG. 13 illustrates an example affine motion symmetric MVD.

Eq. 28 may be illustrated in FIG. 13. FIG. 13 illustrates an example affine motion symmetric MVD. As shown in Eq. 28 and illustrated in FIG. 13, the top left control point MV of a current coding block may be equal to the sum of the MVP for the top left control point of the current coding block and the MVD for the top left control point of the current coding block (or negative MVD depending on the reference picture list). As shown in Eq. 28 and illustrated in FIG. 13, the top left control point MVD associated with reference picture list 1 may be equal to negative of top left control point MVD associated with reference picture list 0 for symmetric affine MVD coding.

The MVs for other control points may be derived using at least the affine MVP prediction, for example, as shown in Eq. 29.

$$\begin{cases} (mvx_{0,j}, mvy_{0,j}) = (mvpx_{0,j} + mvdx_{0,j} + mvdx_{0,0}, mvpy_{0,j} + mvdy_{0,j} + mvdy_{0,0}) \\ (mvx_{1,j}, mvy_{1,j}) = (mvpx_{1,j} - mvdx_{0,0}, mvpy_{1,j} - mvdx_{0,0}) \end{cases} \quad \text{Eq. 29}$$

In Eqs. 28-30, the first dimension of the subscripts may indicate the reference picture list. The second dimension of the subscripts may indicate the control point index.

The translational MVD (e.g., $mvdx_{0,0}$, $mvdy_{0,0}$) of a first reference picture list may be applied to the top-left control point MV derivation of a second reference picture list (e.g., $mvx_{1,0}$, $mvy_{1,0}$). The translational MVD (e.g., $mvdx_{0,0}$, $mvdy_{0,0}$) of the first reference picture list may not be applied to other control point MV derivation of the second reference picture list (e.g., $mvx_{1,j}$, $mvy_{1,j}$). In some examples of symmetric affine MVD derivation, the translational MVD ($mvdx_{0,0}$, $mvdy_{0,0}$) of reference picture list 0 may be applied (e.g., only applied) to the top-left control point MV derivation of reference picture list 1. The other control-point MVs of list 1 may be the same as the corresponding predictor(s), for example, as shown in Eq. 30.

$$\begin{cases} (mvx_{0,j}, mvy_{0,j}) = (mvpx_{0,j} + mvdx_{0,j} + mvdx_{0,0}, mvpy_{0,j} + mvdy_{0,j} + mvdy_{0,0}) \\ (mvx_{1,j}, mvy_{1,j}) = (mvpx_{1,j}, mvpy_{1,j}) \end{cases} \quad \text{Eq. 30}$$

Table 5 shows example syntax that may be used for signaling the use of SMVD in combination with affine mode (e.g., symmetric affine MVD coding).

TABLE 5

| Coding unit syntax for combined SMVD and affine mode | |
|---|---|
| coding_unit( x0, y0, cbWidth, cbHeight, treeType ) { | Descriptor |
| ... | |
|   if( slice_type = = B ) | |
|     inter_pred_idc[ x0 ][ y0 ] | ae(v) |
|   if( sps_affine_enabled_flag && cbWidth >= 16 && cbHeight >= 16 ) { | |
|     inter_affine_flag[ x0 ][ y0 ] | ae(v) |
|     if( sps__affine__type_flag && inter_affine_flag[ x0 ][ y0 ] ) | |
|       cu_affine_type_flag[ x0 ][y0 ] | ae(v) |
|   } | |
|   if( inter_pred_idc[ x0 ][ y0 ] == PRED_BI && sym_mvd_enabled_flag) | |
|     sym_mvd_flag[ x0 ][ y0 ] | ae(v) |

TABLE 5-continued

Coding unit syntax for combined SMVD and affine mode

| coding_unit( x0, y0, cbWidth, cbHeight, treeType ) { | Descriptor |
|---|---|
|     if( inter_pred_idc[ x0 ][ y0 ] != PRED_L1 ) { | |
|       if( num_ref_idx_l0_active_minus1 > 0 && !sym_mvd__flag[ x0 ][ y0 ] ) | |
|         ref_idx_l0[ x0 ][ y0 ] | ae(v) |
|       mvd_coding( x0, y0, 0, 0 ) | |
|       if( MotionModelIdc[ x0 ][ y0 ] > 0 ) | |
|         mvd_coding( x0, y0, 0, 1 ) | |
|       if(MotionModelIdc[ x0 ][ y0 ] > 1 ) | |
|         mvd_coding( x0, y0, 0, 2 ) | |
|       mvp_l0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |
|     if( inter_pred_idc[ x0 ][ y0 ] != PRED_L0 ) { | |
|       if( num_ref_idx_l1_active_minus1 > 0 && !sym_mvd_flag[ x0 ][ y0 ] ) | |
|         ref_idx_l1[ x0 ][ y0 ] | ae(v) |
|       if( mvd_l1_zero_flag && inter_pred_idc[ x0 ][ y0 ] == PRED_BI ) { | |
|         ... | |
|       } else { | |
|         if( !sym_mvd_flag[ x0 ][ y0 ] ) { | |
|           mvd_coding( x0, y0, 1, 0 ) | |
|         if( MotionModelIdc[ x0 ][ y0 ] > 0 ) | |
|           mvd_coding( x0, y0, 1, 1 ) | |
|         if(MotionModelIdc[ x0 ][ y0 ] > 1 ) | |
|           mvd_coding( x0, y0, 1, 2 ) | |
|       } | |
|       mvp_l1_flag[ x0 ][ y0 ] | ae(v) |
|     } else { | |
|       MvdL1[ x0 ][ y0 ][ 0 ] = 0 | |
|       MvdL1[ x0 ][ y0 ][ 1 ] = 0 | |
|     } | |
|     ... | |
|   } | |
| } | |
| ... | |
| } | |

Whether affine SMVD is used may be determined, for example, based on an inter-affine indication and/or an SMVD indication. For example, when inter-affine indication inter_affine_flag is 1 and SMVD indication sym_mvd_flag [x0][y0] is 1, affine SMVD may be applied. When inter-affine indication inter_affine_flag is 0 and SMVD indication sym_mvd_flag[x0][y0] is 1, non-affine motion SMVD may be applied. If SMVD indication sym_mvd_flag[x0][y0] is 0, SMVD may not be applied.

The MVDs of the control points in a reference picture list (e.g., reference picture list 0) may be signaled. In an example, the MVD value(s) of a subset of the control points in a reference picture list may be signaled. For example, the MVD of the top-left control point in reference picture list 0 may be signaled. The signaling of the MVDs of the other control points in reference picture list 0 may be skipped, and, for example, the MVDs of these control points may be set to 0. The MVs of the other control points may be derived based on the MVD of the top-left control point in reference picture list 0. For example, the MVs of the control points, whose MVDs are not signaled, may be derived as shown in Eq. 31.

$$\begin{cases} (mvx_{0,j}, mvy_{0,j}) = (mvpx_{0,j} + mvdx_{0,0}, mvpy_{0,j} + mvdy_{0,0}) \\ (mvx_{1,j}, mvy_{1,j}) = (mvpx_{1,j} - mvdx_{0,0}, mvpy_{1,j} - mvdx_{0,0}) \end{cases} \quad \text{Eq. 31}$$

Table 6 shows example syntax that may be used for signaling the information related to SMVD mode in combination with affine mode.

TABLE 6

Example coding unit syntax for combined SMVD and affine mode

| coding_unit( x0, y0, cbWidth, cbHeight, treeType ) { | Descriptor |
|---|---|
|   ... | |
|   if( slice_type == B ) | |
|     inter_pred_idc[ x0 ][ y0 ] | ae(v) |
|   if( sps_affine_enabled_flag && cb)Width >= 16 && cbHeight >= 16 ) { | |
|     inter_affine_flag[ x0 ][ y0 ] | ae(v) |
|     if( sps_affine_type_flag && inter_affine_flag[ x0 ][ y0 ] ) | |
|       cu_affine_type_flag[ x0 ][ y0 ] | ae(v) |
|   } | |
|   if( inter_pred_idc[ x0 ][ y0 ] == PRED_BI && sym_mvd_enabled_flag) | |
|     sym_mvd_flag[ x0 ][ y0 ] | ae(v) |

TABLE 6-continued

Example coding unit syntax for combined SMVD and affine mode

| coding_unit( x0, y0, cbWidth, cbHeight, treeType ) { | Descriptor |
|---|---|
|     if( inter_pred_idc[ x0 ][ y0 ] != PRED_L1 ) { | |
|       if( num_ref_idx_l0_active_minus1 > 0 && !sym_mvd_flag[ x0 ][ y0 ] ) | |
|         ref_idx_l0[ x0 ][ y0 ] | ae(v) |
|       mvd_coding( x0, y0, 0, 0 ) | |
|       if( MotionModelIdc[ x0 ][ y0 ] > 0 && !sym_mvd_flag[ x0 ][ y0 ]) | |
|         mvd_coding( x0, y0, 0, 1 ) | |
|       if(MotionModelIdc[ x0 ][ y0 ] > 1 && !sym_mvd_flag[ x0 ][ y0 ]) | |
|         mvd_coding( x0, y0, 0, 2 ) | |
|       mvp_l0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |
|     if( inter_pred_idc[ x0 ][ y0 ] != PRED_L0 ) { | |
|       if( num_ref_idx_l1_active_minus1 > 0 && !sym_mvd_flag[ x0 ][ y0 ] ) | |
|         ref_idx_l1 [ x0 ][ y0 ] | ae(v) |
|       if( mvd_l1_zero_flag && inter_pred_idc[ x0 ][ y0 ] == PRED_B1 ) { | |
|         ... | |
|       } else { | |
|         if( !sym_mvd_flag[ x0 ][ y0 ] ) { | |
|           mvd_coding( x0, y0, 1, 0 ) | |
|         if( MotionModelIdc[ x0 ][ y0 ] > 0 ) | |
|           mvd_coding( x0, y0, 1, 1 ) | |
|         if(MotionModelIdc[ x0 ][ y0 ] > 1 ) | |
|           mvd_coding( x0, y0, 1, 2 ) | |
|       } | |
|       mvp_l1_flag[ x0 ][ y0 ] | ae(v) |
|     } else { | |
|       MvdL1[ x0 ][ y0 ][ 0 ] = 0 | |
|       MvdL1[ x0 ][ y0 ][ 1 ] = 0 | |
|     } | |
|     ... | |
|   } | |
| } | |
| ... | |
| } | |

An indication, such as a top left MVD only flag, may indicate whether only the MVD of the top-left control point in a reference picture list (e.g., reference picture list 0) is signaled, or whether the MVDs of the control points in the reference picture list are signaled. This indication may be signaled at the CU level. Table 7 shows example syntax that may be used for signaling the information related to SMVD mode in combination with affine mode.

TABLE 7

Example coding unit syntax for combined SMVD and affine mode

| coding_unit( x0, y0, cbWidth, cbHeight, treeType ) { | Descriptor |
|---|---|
| ... | |
|   if( slice_type == B ) | |
|     inter_pred_idc[ x0 ][ y0 ] | ae(v) |
|   if( sps_affine_enabled_flag && cbWidth >= 16 && cbHeight >= 16 ) { | |
|     inter_affine_flag[ x0 ][ y0 ] | ae(v) |
|     if( sps_affine_type_flag && inter_affine_flag[ x0 ][ y0 ] ) | |
|       cu_affine_type_flag[ x0 ][ y0 ] | ae(v) |
|   } | |
|   if( inter_pred_idc[ x0 ][ y0 ] == PRED_BI && sym_mvd_enabled_flag) | |
|     sym_mvd_flag[ x0 ][ y0 ] | ae(v) |
|   if( inter_pred_idc[ x0 ][ y0 ] == PRED_BI && sym_mvd_enabled_flag) | |
|     top_left_mvd_only_flag[ x0 ][ y0 ] | ae(v) |
|   if( inter_pred_idc[ x0 ][ y0 ] != PRED_L1 ) { | |
|     if( num_ref_idx_l0_active_minus1 > 0 && !sym_mvd_flag[ x0 ][ y0 ] ) | |
|       ref_Idx_l0[ x0 ][ y0 ] | ae(v) |
|     mvd_coding( x0, y0, 0, 0 ) | |
|     if( MotionModelIdc[ x0 ][ y0 ] > 0 && !sym_mvd_flag[ x0 ][ y0 ] | |
|       && ! top_left_mvd_only_flag[ x0 ][ y0 ]) | |
|       mvd_coding( x0, y0, 0, 1 ) | |
|     if(MotionModelIdc[ x0 ][ y0 ] > 1&& !sym_mvd_flag[ x0 ][ y0 ] | |
|       && ! topleft_mvd_only_flag[ x0 ][ y0 ]) | |

TABLE 7-continued

Example coding unit syntax for combined SMVD and affine mode

| coding_unit( x0, y0, cbWidth, cbHeight, treeType ) { | Descriptor |
|---|---|
|       mvd_coding( x0, y0, 0, 2 ) | |
|       mvp_l0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |
|     if( inter_pred_idc[ x0 ][ y0 ] != PRED_L0 ) { | |
|       if( num_ref_idx_l1_active_minus1 > 0 && !sym_mvd_flag[ x0 ][ y0 ] ) | |
|         ref_Idx_l1[ x0 ][ y0 ] | ae(v) |
|       if( mvd_l1_zero_flag && inter_pred_idc[ x0 ][ y0] = = PRED_BI ) { | |
|         ... | |
|       } else { | |
|         if( !sym_mvd_flag[ x0 ][ y0 ] ) { | |
|           mvd_coding( x0, y0, 1, 0 ) | |
|         if( MotionModelIdc[ x0 ][ y0 ] > 0 ) | |
|           mvd_coding( x0, y0, 1, 1 ) | |
|         if(MotionModelIdc[ x0 ][ y0 ] > 1 ) | |
|           mvd_coding( x0, y0, 1, 2 ) | |
|       } | |
|       mvp_l1_flag[ x0 ][ y0 ] | ae(v) |
|     } else { | |
|       MvdL1[ x0 ][ y0 ][ 0 ] = 0 | |
|       MvdL1[ x0 ][ y0 ][ 1 ] = 0 | |
|     } | |
|     ... | |
|   } | |
| } | |
| ... | |
| } | |

In examples, a combination of direction index and distance index, as described herein with respect to MMVD, may be signaled. Example direction table and example distance table are shown in Table 1 and Table 2. For example, a combination of distance index 0 and direction index 0 may indicate MVD (½, 0).

In examples, an indication (e.g., a flag) may be signaled to indicate which reference picture list's MVDs are signaled. The other reference picture list's MVDs may not be signaled; they may be derived.

One or more restrictions described herein for translational motion symmetric MVD coding may be applied to affine motion symmetric MVD coding, for example, to reduce complexity and/or reduce signaling overhead.

With the symmetric affine MVD mode, signaling overhead may be reduced. Coding efficiency may be improved.

Bi-predictive motion estimation may be used to search for a symmetric MVD for an affine model. In an example, to find a symmetric MVD for affine model (e.g., the best symmetric MVD for affine model), the bi-predictive motion estimation may be applied after uni-prediction search. The reference pictures for reference picture list 0 and/or reference picture list 1 may be derived as described herein. The initial control point MVs may be selected from one or more of the uni-prediction searching results, bi-prediction searching results, and/or the MVs from the affine AMVP list. A control point MV (e.g., the control point MV with the lowest rate-distortion cost) may be selected to be the initial MV. A coding device (e.g., the encoder) may check one or more cases: in a first case, symmetric MVD may be signaled for reference picture list 0, and control point MVs for reference picture list 1 may be derived based on symmetric mapping (using Eq. 28 and/or Eq. 29); in a second case, symmetric MVD for reference picture list 1 may be signaled, and control point MVs for reference picture list 0 may be derived based on symmetric mapping. The first case may be used as an example herein. The symmetric MVD search technique may be applied based on uni-prediction searching results. Given the control point MV predictors in reference picture list 1, an iterative search using a pre-defined search pattern (e.g., diamond pattern, cubic pattern, and/or the like) may be applied. At an iteration (e.g., each iteration), the MVD may be refined by the search pattern, and the control point MVs in reference picture list 0 and reference picture list 1 may be derived using Eq. 28 and/or Eq. 29. The bi-prediction error corresponding to control point MVs of reference picture list 0 and reference picture list 1 may be evaluated. The rate-distortion cost may be estimated, for example, by summing the bi-prediction error and the weighted rate of MVD coding for reference picture list 0. In an example, the MVD with a low (e.g., the lowest) rate-distortion cost during the searching candidates may be treated as the best MVD for the symmetric MVD search process. The other control point MVs such as top-right and bottom-left control point MVs may be refined, e.g., using the optical flow-based technique described herein.

Symmetric MVD search for symmetric affine MVD coding may be performed. In an example, a set of parameters such as translational parameters may be searched first, followed by non-translational parameters searching. In an example, optical flow search may be performed by (e.g., jointly) considering the MVD of reference picture list 0 and reference picture list 1. For 4-parameter affine model, an example optical flow equation for the list 0 MVDs may be shown in Eq. 32.

$$I_k^{0'}(i,j) - I(i,j) = (g_x^0(i,j) \cdot i + g_y^0(i,j) \cdot j) \cdot c + (-g_x^0(i,j) \cdot j + g_y^0(i,j) \cdot i) \cdot d + g_x^0(i,j) \cdot a + g_y^0(i,j) \cdot b$$ Eq. 32 where $I_k^{0'}$ may denote the list 0 prediction in the k-th iteration, and $g_x^0$ and $g_y^0$ may denote spatial gradients of the list 0 prediction.

Reference picture list 1 may have translation change (e.g., may have translation change only). The translation change may have the same magnitude as that of reference picture list 0 but in a reverse direction, which is the condition of symmetric affine MVD. An example optical flow equation for reference picture list 1 MVDs may be shown in Eq. 33.

$$I_k^{1'}(i,j) - I(i,j) = -g_x^1(i,j) \cdot a - g_y^1(i,j) \cdot b \qquad \text{Eq. 33}$$

The BCW weights $w_0$ and $w_1$ to list 0 prediction and list 1 prediction may be applied respectively. An example optical equation for the symmetric affine model may be shown in Eq. 34, $$I_k'(i,j) - I(i,j) = (G_x(i,j) \cdot i + G_y(i,j) \cdot j) \cdot c + (-G_x(i,j) \cdot j + G_y(i,j) \cdot i) \cdot d + H_x(i,j) \cdot a + H_y(i,j) \cdot b \qquad \text{Eq. 34}$$

where $$I_k'(i,j) = w_0 \cdot I_k^{0'}(i,j) + w_1 \cdot I_k^{1'}(i,j)$$

$$G_x(i,j) = g_x^0 \cdot w_0$$

$$G_y(i,j) = g_y^0 \cdot w_0$$

$$H_x(i,j) = g_x^0 \cdot w_0 - g_x^1 \cdot w_1$$

$$H_y(i,j) = g_y^0 \cdot w_0 - g_y^1 \cdot w_1$$

Parameters a, b, c, d may be estimated (e.g., by the least mean square error calculation).

An example optical flow equation for symmetric 6-parameter affine model may be shown in Eq. 35.

$$I_k'(i,j) - (i,j) = G_x(i,j) \cdot i \cdot c + G_x(i,j) \cdot j \cdot d + G_y(i,j) \cdot i \cdot e + G_y(i,j) \cdot j \cdot f + H_x(i,j) \cdot a + H_y(i,j) \cdot b \qquad \text{Eq. 35}$$

Parameters a, b, c, d, e, f may be estimated by the least mean square error calculation. When joint optical-flow motion search is performed, the affine parameters may be optimized jointly. Performance may be improved.

Early termination may be applied, e.g., to reduce complexity. In examples, e.g., before initial MV selection, the search may be terminated if the bi-prediction cost is larger than a value (e.g., a threshold value). For example, the value can be set to a multiple of the cost of uni-prediction cost, e.g., 1.1 times the cost of uni-prediction cost. In examples, a coding device (e.g., the encoder) may, before the ME of symmetric affine MVD starts, compare the current best affine motion estimation (ME) cost (considering uni-prediction and bi-prediction affine search) with the non-affine ME cost. If the current best affine ME cost is larger than the non-affine ME cost multiplied by a value (e.g., a threshold value such as 1.1), the coding device may skip the ME of symmetric affine MVD. In examples, e.g., after initial MV selection, the affine symmetric MVD search may be skipped if the cost of the initial MV is higher than a value (e.g., a threshold value). For example, the value may be a multiple (e.g., set to 1.1 times) of the lowest among uni-prediction cost and bi-prediction cost. In examples, the value may be set to a multiple (e.g., 1.1) times of the non-affine ME cost.

SMVD mode may be combined with BCW. When the BCW is enabled for current CU, SMVD may be applied in one or more ways. In certain examples, SMVD may be enabled when (e.g., only when) the BCW weight is equal weight (e.g., 0.5); and, SMVD may be disabled for other BCW weights. In such a case, the SMVD flag may be signaled before BCW weight index, and the signaling of BCW weight index may be conditionally controlled by the SMVD flag. When SMVD indication (e.g., SMVD flag) may have a value of 1, the signaling of BCW weight index may be skipped. The decoder may infer the SMVD indication as having a value 0, which may correspond to the equal weight for bi-predictive averaging. When the SMVD flag is 0, the BCW weight index may be coded for bi-prediction mode. In the example where SMVD may be enabled when the BCW weight is equal weight and disabled for other BCW weights, the BCW index may sometimes be skipped. In some examples, the SMVD may be fully combined with BCW. The SMVD flag and BCW weight index may be signaled for explicit bi-prediction mode. The MVD search (e.g., of the encoder) for SMVD may consider the BCW weight index during bi-predictive averaging. The SMVD search may be based on an evaluation of one or more (e.g., all) possible BCW weights.

A coding tool (e.g., bi-directional optical flow (BDOF)) may be used in association with one or more other coding tools/modes. BDOF may be used in association with SMVD. Whether BDOF is applied for a coding block may depend on whether SMVD is used. SMVD may be based on the assumption of symmetric MVD at a coding block level. BDOF, if performed, may be used to refine sub-block MVs based on optical flow. Optical flow may be based on the assumption of symmetric MVD at a sub-block level.

BDOF may be used in association with SMVD. In an example, a coding device (e.g., a decoder or an encoder) may receive one or more indications that SMVD and/or BDOF are enabled. BDOF may be enabled for the current picture. The coding device may determine whether BDOF is to be bypassed or performed on a current coding block. The coding device may determine whether to bypass BDOF based on an SMVD indication (e.g., sym_mvd_flag[x0][y0]). BDOF may be used interchangeably with BIO in some examples.

The coding device may determine whether to bypass BDOF for a current coding block. BDOF may be bypassed on the current coding block if SMVD mode is used for motion vector coding of the current coding block, e.g., to reduce decoding complexity. If SMVD is not used for the motion vector coding of the current coding block, the coding device may determine whether to enable BDOF for the current coding block, for example, based on at least another condition.

The coding device may obtain an SMVD Indication (e.g., sym_mvd_flag[x0][y0]). The SMVD indication may indicate whether SMVD is used in motion vector coding for the current coding block.

The current coding block may be reconstructed based on the determination of whether to bypass BDOF. An MVD may be signaled (e.g., explicitly signaled) at the CU level for the SMVD mode.

The coding device may be configured to perform motion vector coding using SMVD without BDOF based on the determination to bypass BDOF.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A video processing device comprising:
 a processor configured to:
  determine that bi-directional optical flow (BDOF) is enabled for a picture comprising a current coding block;
  obtain a symmetric motion vector difference (SMVD) indication associated with the current coding block, the SMVD indication indicating whether SMVD is used in a determination of a motion vector (MV) for the current coding block;
  determine whether to bypass BDOF for the current coding block based on the SMVD indication associated with the current coding block, wherein, the processor is configured to determine, on a condition that SMVD is used in the determination of the MV for the current coding block, to bypass BDOF for the current coding block; and
  reconstruct the current coding block based on the determination of whether to bypass BDOF.

2. The video processing device of claim 1, wherein SMVD uses a motion vector difference (MVD) for the current coding block, and the MVD indicates a difference between a motion vector predictor (MVP) for the current coding block and the MV for the current coding block.

3. The video processing device of claim 2, wherein the MVP for the current coding block is determined based on an MV of a spatial neighboring block of the current coding block or a temporal neighboring block of the current coding block.

4. The video processing device of claim 1, wherein, on a condition that the SMVD indication indicates SMVD is used in the determination of the MV for the current coding block, the processor is configured to:
  receive a first MV information associated with a first reference picture list; and
  determine a second MV information associated with a second reference picture list based on the first MV information associated with the first reference picture list, wherein a motion vector difference (MVD) associated with the first reference picture list and an MVD associated with the second reference picture list are symmetric.

5. The video processing device of claim 1, wherein, on a condition that the SMVD indication indicates SMVD is used in the determination of the MV for the current coding block, the processor is configured to:
  parse a first motion vector difference (MVD) associated with a first reference picture list in video data; and
  determine a second MVD associated with a second reference picture list based on the first MVD, wherein the first MVD and the second MVD are symmetric to each other.

6. The video processing device of claim 1, wherein based on a determination not to bypass BDOF for the current coding block, the processor is configured to:
  refine an MV associated with a sub-block of the current coding block based at least in part on gradients associated with a location in the current coding block.

7. The video processing device of claim 1, wherein the processor is configured to receive a sequence-level SMVD indication indicating whether SMVD is enabled for a sequence of pictures, the current coding block being comprised in the picture that is in the sequence, wherein, on a condition that SMVD is enabled for the sequence, the processor is configured to obtain the SMVD indication associated with the current coding block based on the sequence-level SMVD indication.

8. The video processing device of claim 1, wherein reconstructing the current coding block based on the determination of whether to bypass BDOF comprises reconstructing the current coding block without performing BDOF based on the determination to bypass BDOF.

9. A method comprising:
  determining that bi-directional optical flow (BDOF) is enabled for a picture comprising a current coding block;
  obtaining a symmetric motion vector difference (SMVD) indication associated with the current coding block, the SMVD indication indicating whether SMVD is used in a determination of a motion vector (MV) for the current coding block;
  determining whether to bypass BDOF for the current coding block based on the SMVD indication associated with the current coding block, wherein, on a condition that SMVD is used in the determination of the MV for the current coding block, the method comprises bypassing BDOF for the current coding block; and
  reconstructing the current coding block based on the determination of whether to bypass BDOF.

10. The method of claim 9, wherein SMVD uses a motion vector difference (MVD) for the current coding block, and the MVD indicates a difference between a motion vector predictor (MVP) for the current coding block and the MV for the current coding block.

11. The method of claim 10, wherein the MVP for the current coding block is determined based on an MV of a spatial neighboring block of the current coding block or a temporal neighboring block of the current coding block.

12. The method of claim 9, wherein, on a condition that the SMVD indication indicates SMVD is used in the determination of the MV for the current coding block, the method comprises:
  receiving a first MV information associated with a first reference picture list; and
  determining a second MV information associated with a second reference picture list based on the first MV information associated with the first reference picture list, wherein a motion vector difference (MVD) associated with the first reference picture list and an MVD associated with the second reference picture list are symmetric.

13. The method of claim 9, wherein, on a condition that the SMVD indication indicates SMVD is used in the determination of the MV for the current coding block, the method comprises:
  parsing a first motion vector difference (MVD) associated with a first reference picture list in video data; and
  determining a second MVD associated with a second reference picture list based on the first MVD, wherein the first MVD and the second MVD are symmetric to each other.

14. The method of claim 9, wherein, based on a determination not to bypass BDOF for the current coding block, the method comprises:
  refining an MV associated with a sub-block of the current coding block based at least in part on gradients associated with a location in the current coding block.

15. The method of claim 9, comprising receiving a sequence-level SMVD indication indicating whether SMVD is enabled for a sequence of pictures, the current coding block being comprised in the picture that is in the sequence, wherein, on a condition that SMVD is enabled for the sequence, the method comprises obtaining the SMVD indication associated with the current coding block based on the sequence-level SMVD indication.

16. The method of claim 9, wherein reconstructing the current coding block based on the determination of whether to bypass BDOF further comprises reconstructing the current coding block without performing BDOF based on the determination to bypass BDOF.

17. The method of claim 9, wherein the method is performed by a decoder.

18. The method of claim 9, wherein the method is performed by an encoder.

19. The video processing device of claim 1, wherein the video processing device comprises a memory.

20. A non-transitory computer-readable medium including instructions for causing one or more processors to:
   determine that bi-directional optical flow (BDOF) is enabled for a picture comprising a current coding block;
   obtain a symmetric motion vector difference (SMVD) indication associated with the current coding block, the SMVD indication indicating whether SMVD is used in a determination of a motion vector (MV) for the current coding block;
   determine whether to bypass BDOF for the current coding block based on the SMVD indication associated with the current coding block, wherein, on a condition that SMVD is used in the determination of the MV for the current coding block, BDOF is determined to be bypassed for the current coding block; and
   reconstruct the current coding block based on the determination of whether to bypass BDOF.

21. The non-transitory computer-readable medium of claim 20, further comprising instructions for causing the one or more processors to, based on a condition that the SMVD indication indicates SMVD is used in the determination of the MV for the current coding block:
   receive a first MV information associated with a first reference picture list; and
   determine a second MV information associated with a second reference picture list based on the first MV information associated with the first reference picture list, wherein a motion vector difference (MVD) associated with the first reference picture list and an MVD associated with the second reference picture list are symmetric.

22. The non-transitory computer-readable medium of claim 20, further comprising instructions for causing the one or more processors to, based on a determination not to bypass BDOF for the current coding block, refine an MV associated with a sub-block of the current coding block based at least in part on gradients associated with a location in the current coding block.

* * * * *